US012684539B2

(12) United States Patent
Baron et al.

(10) Patent No.: US 12,684,539 B2
(45) Date of Patent: Jul. 14, 2026

(54) METHOD AND APPARATUS FOR MULTI-USER DIRECT LINK TRANSMISSION

(71) Applicant: CANON KABUSHIKI KAISHA, Tokyo (JP)

(72) Inventors: Stéphane Baron, Le Rheu (FR); Romain Guignard, Rennes (FR); Pascal Viger, Janze (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 702 days.

(21) Appl. No.: 17/927,607

(22) PCT Filed: May 21, 2021

(86) PCT No.: PCT/EP2021/063657
§ 371 (c)(1),
(2) Date: Nov. 23, 2022

(87) PCT Pub. No.: WO2021/239618
PCT Pub. Date: Dec. 2, 2021

(65) Prior Publication Data
US 2023/0209512 A1     Jun. 29, 2023

(30) Foreign Application Priority Data
May 25, 2020     (GB) ..................................... 2007771

(51) Int. Cl.
*H04W 72/0446*     (2023.01)
*H04W 72/25*     (2023.01)
*H04W 72/51*     (2023.01)
(52) U.S. Cl.
CPC ....... *H04W 72/0446* (2013.01); *H04W 72/25* (2023.01); *H04W 72/51* (2023.01)

(58) Field of Classification Search
CPC . H04W 72/0446; H04W 72/25; H04W 72/51; H04W 72/23; H04W 84/12;
(Continued)

(56) References Cited

U.S. PATENT DOCUMENTS 9,608,796 B2 *   3/2017   Merlin ...................... H04J 1/02
2012/0263137 A1 *  10/2012   Walton ................ H04W 52/383
                                            370/328
(Continued)

FOREIGN PATENT DOCUMENTS

CN       107735993 A     2/2018
JP      2020014250 A     1/2020
(Continued)

OTHER PUBLICATIONS

Stephane Baron, triggered-p2p-transmissions; Baron, IEEE Draft; IEEE-SA Mentor, XP068167155, vol. 802.11 EHT; 802.11be, No. 1 Mar. 18, 2020, p. 1-9, (URL:https://mentor/ieee.org/802.11/dcn/20/11-20-0095-01-00b3-triggered-p2p-transmissions.pptx) (Retrieved on Mar. 18, 2020).
(Continued)

*Primary Examiner* — Khaled M Kassim
(74) *Attorney, Agent, or Firm* — Canon U.S.A., Inc. IP Division

(57)     ABSTRACT
Aspects of the present disclosure generally relate to multi-user (MU) Peer to Peer (P2P) protocols in wireless networks. A first station (STA) may receiving, from an access point (AP), an allocation of a resource unit (RU) for a peer to peer (P2P) communication; transmit, to a peer second STA, a first frame over a first part of the allocated P2P RU; and receive a second frame transmitted by the second STA over a second part of the P2P RU allocated to the first STA by the AP.

13 Claims, 15 Drawing Sheets

(58) Field of Classification Search
CPC . H04W 92/18; H04W 72/121; H04W 74/002;
H04W 74/04; H04W 76/14; H04L 5/0044
See application file for complete search history.

(56) References Cited

U.S. PATENT DOCUMENTS

| | | | | |
|---|---|---|---|---|
| 2015/0036733 A1* | 2/2015 | Smadi | .................. | H04N 19/172 |
| | | | | 375/240.01 |
| 2016/0183292 A1* | 6/2016 | Trainin | ............... | H04M 7/0063 |
| | | | | 370/336 |
| 2016/0294439 A1* | 10/2016 | Kim | ....................... | H04B 1/713 |
| 2018/0020372 A1 | 1/2018 | Viger | | |
| 2020/0008210 A1* | 1/2020 | Li | ..................... | H04W 72/1263 |
| 2020/0045723 A1 | 2/2020 | Chun | | |
| 2021/0168712 A1* | 6/2021 | Cherian | ............ | H04W 52/0216 |
| 2021/0328741 A1* | 10/2021 | Jang | ................... | H04L 27/2666 |
| 2023/0354377 A1* | 11/2023 | Yang | ................ | H04W 28/0278 |
| 2024/0073966 A1* | 2/2024 | Patil | ................. | H04W 74/0825 |

FOREIGN PATENT DOCUMENTS

| | | |
|---|---|---|
| JP | 2020074539 A | 5/2020 |
| WO | 2020011684 A1 | 1/2020 |

OTHER PUBLICATIONS

Stephane Baron, Direct Link MU transmissions, IEEE Draft; IEEE-SA Mentor, XP068153981, vol. 802.11 EHT, 802.11be, No. 2, Sep. 19, 2018, p. 1-11, (URLhttps://mentor/ieee.org/802.11/dcn/19/11-19-1117-02-00be-direct-link-mu-transmissions.pptx) (Retrieved on Sep. 19, 2019).

* cited by examiner

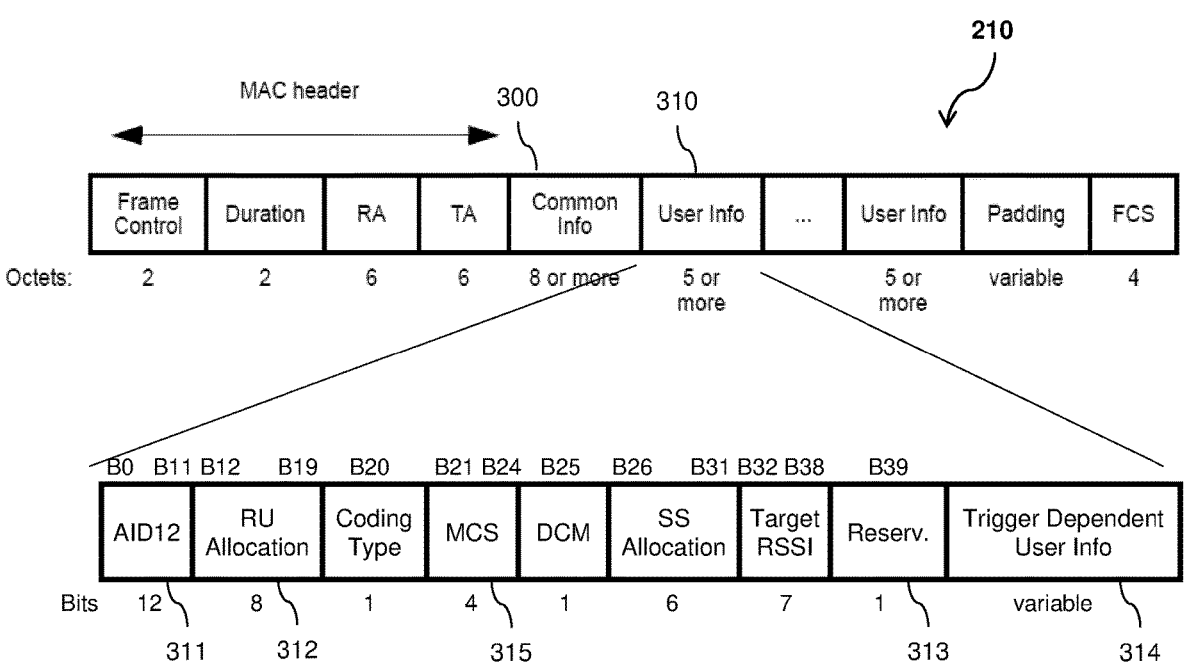
Figure 3a
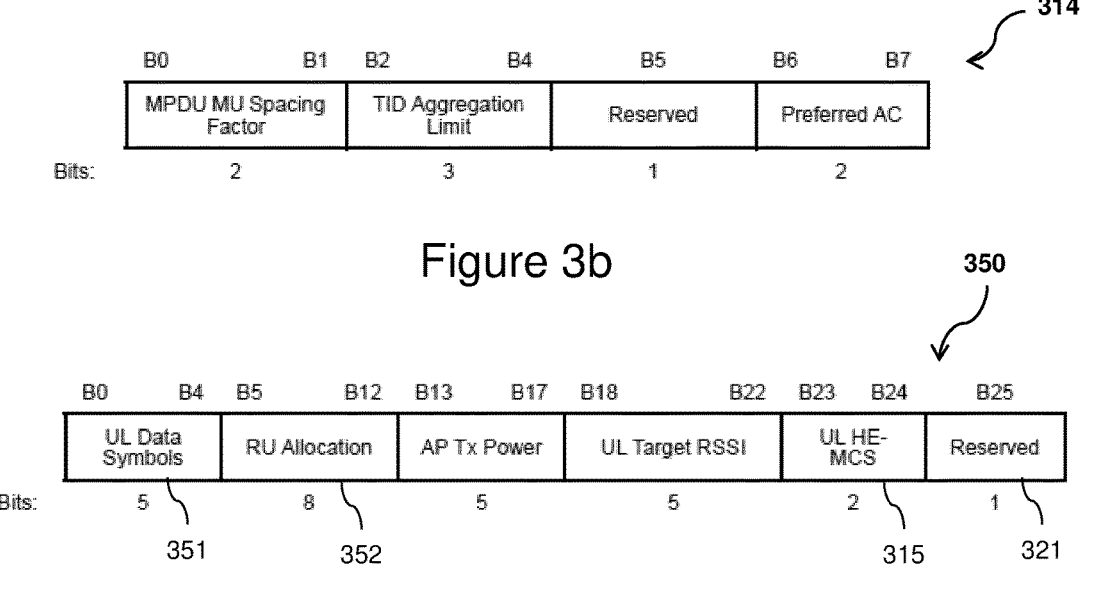
Figure 3b
Figure 3c

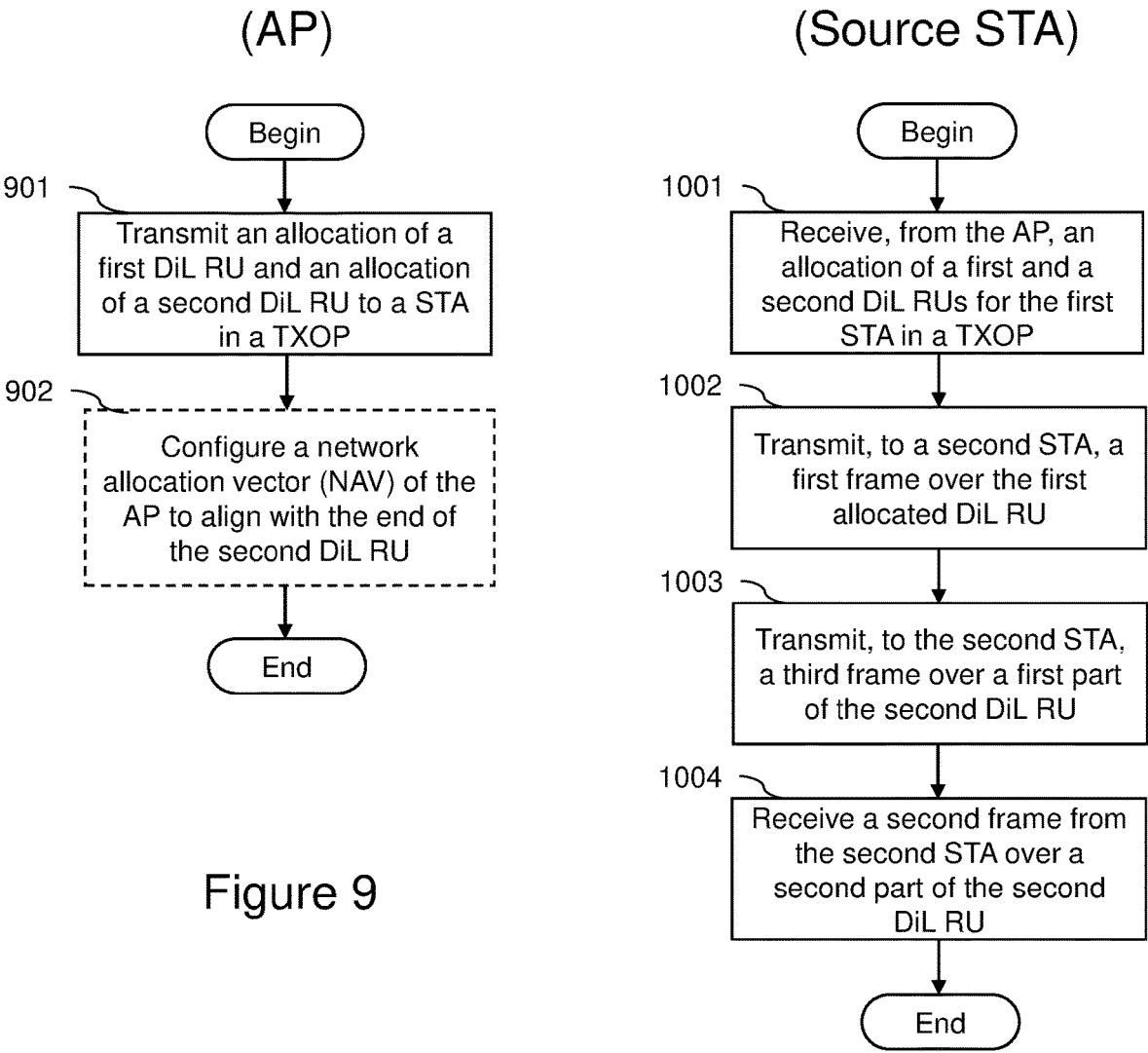

(AP)

Begin

901 — Transmit an allocation of a first DiL RU and an allocation of a second DiL RU to a STA in a TXOP 902 — Configure a network allocation vector (NAV) of the AP to align with the end of the second DiL RU End

Figure 9

(Source STA)

Begin

1001 — Receive, from the AP, an allocation of a first and a second DiL RUs for the first STA in a TXOP 1002 — Transmit, to a second STA, a first frame over the first allocated DiL RU 1003 — Transmit, to the second STA, a third frame over a first part of the second DiL RU 1004 — Receive a second frame from the second STA over a second part of the second DiL RU End

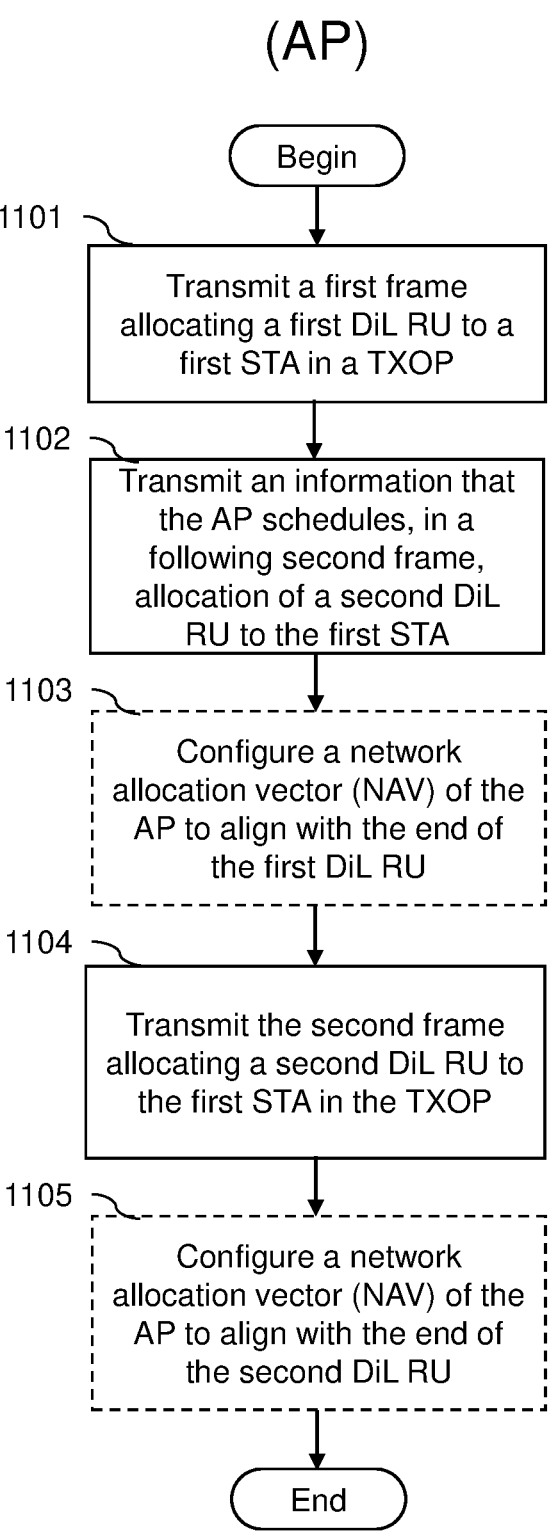

Begin

1101

Transmit a first frame allocating a first DiL RU to a first STA in a TXOP

1102

Transmit an information that the AP schedules, in a following second frame, allocation of a second DiL RU to the first STA

1103

Configure a network allocation vector (NAV) of the AP to align with the end of the first DiL RU

1104

Transmit the second frame allocating a second DiL RU to the first STA in the TXOP

1105

Configure a network allocation vector (NAV) of the AP to align with the end of the second DiL RU End

Figure 11

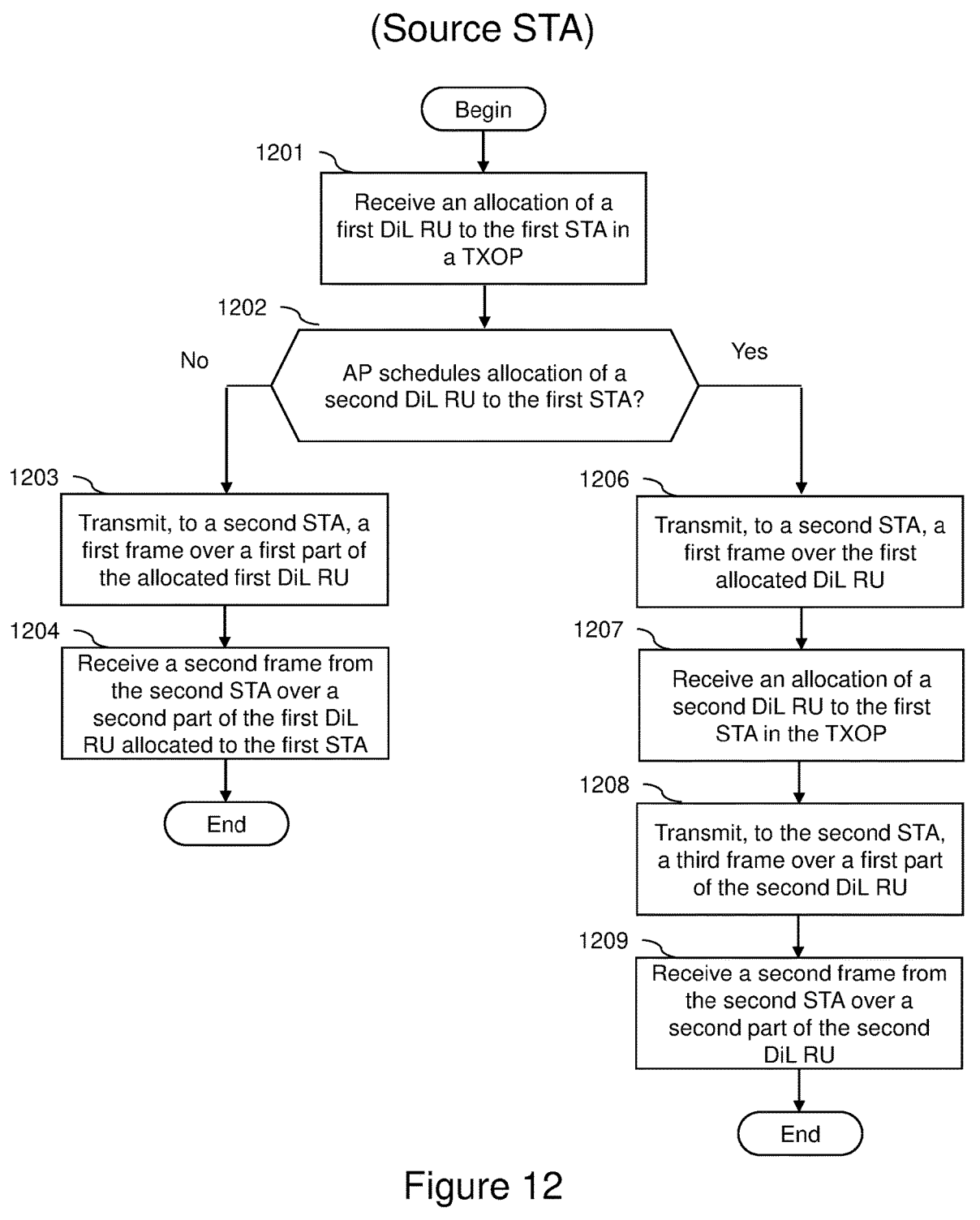

(Source STA)

```
                        ┌──────────┐
                        │  Begin   │
                        └────┬─────┘
                             │
    1201 ~              ┌────▼─────────────────┐
                        │ Receive an allocation of a │
                        │ first DiL RU to the first STA in │
                        │        a TXOP        │
                        └──────────┬───────────┘
                                   │
    1202 ~                         ▼
              No    ┌─────────────────────────────┐   Yes
          ┌─────────┤  AP schedules allocation of a  ├─────────┐
          │         │  second DiL RU to the first STA?  │         │
          │         └─────────────────────────────┘         │
          │                                                  │
 1203 ~   ▼                                      1206 ~      ▼
┌──────────────────────┐                     ┌──────────────────────┐
│ Transmit, to a second STA, a │             │ Transmit, to a second STA, a │
│ first frame over a first part of │         │ first frame over the first │
│ the allocated first DiL RU │             │    allocated DiL RU    │
└──────────┬───────────┘                     └──────────┬───────────┘
           │                                            │
 1204 ~    ▼                                  1207 ~    ▼
┌──────────────────────┐                     ┌──────────────────────┐
│ Receive a second frame from │              │ Receive an allocation of a │
│   the second STA over a   │               │ second DiL RU to the first │
│ second part of the first DiL │            │      STA in the TXOP      │
│ RU allocated to the first STA │           └──────────┬───────────┘
└──────────┬───────────┘                                │
           │                                  1208 ~    ▼
      ┌────▼─────┐                            ┌──────────────────────┐
      │   End    │                            │ Transmit, to the second STA, │
      └──────────┘                            │ a third frame over a first part │
                                              │   of the second DiL RU   │
                                              └──────────┬───────────┘
                                                         │
                                               1209 ~    ▼
                                              ┌──────────────────────┐
                                              │ Receive a second frame from │
                                              │   the second STA over a   │
                                              │ second part of the second │
                                              │        DiL RU        │
                                              └──────────┬───────────┘
                                                         │
                                                    ┌────▼─────┐
                                                    │   End    │
                                                    └──────────┘
```

Figure 12

METHOD AND APPARATUS FOR MULTI-USER DIRECT LINK TRANSMISSION

CROSS-REFERENCE TO RELATED APPLICATIONS

This application the National Phase application of PCT Application No. PCT/EP2021/063657, filed on May 21, 2021 and titled "METHOD AND APPARATUS FOR MULTI-USER DIRECT LINK TRANSMISSION." This application claims the benefit under 35 U.S.C. § 119(a)-(d) of United Kingdom Patent Application No. 2007771.5, filed on May 25, 2020 and entitled "METHOD AND APPARA-TUS FOR MULTI-USER DIRECT LINK TRANSMIS-SION". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 6.0 (D6.0) of November 2019.

Thanks to the MU feature, a station has the opportunity to gain access to the wireless medium via two access schemes: the MU scheme and the conventional Enhanced Distributed Channel Access—EDCA (Single User) scheme.

The 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique. The assignment of the RUs to the stations is signaled at the beginning of the MU Downlink frame, by providing an association identifier (AID) of a non-AP station (individually obtained by each station during its association procedure with the AP) for each RU defined in the transmission opportunity.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using 16-bit Association IDentifiers (AIDs) assigned to them upon registration to the AP and/or using reserved AIDs designating a group of non-AP stations.

The adopted 802.11ax MU transmission scheme is not adapted to bandwidth-demanding communication services, e.g. video-based services such as gaming, virtual reality, streaming applications. This is because all the communications go through the AP, thereby doubling the air time for transmission but also the number of medium accesses (and thus of medium access time).

The Single User (SU) scheme of 802.11 network protocol allows a direct link (DiL, also called peer-to-peer (P2P) transmission) to be performed wherein the data (MAC) frames are addressed using the 48-bit IEEE MAC address of the destination station. However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

One may contemplate to integrate P2P communications under the global policy of the AP's scheduling. However, this raises some challenges as the AP has to manage both transmission of data by a non-AP station to a peer non-AP station and the transmission of data back from the peer non-AP station to the non-AP station.

More generally, 802.11 is seen as not being adapted to peer-to-peer transmissions, and MU transmissions as conventionally specified can be improved.

SUMMARY OF INVENTION

It is a broad objective of the present invention to improve this situation.

The inventors have contemplated taking benefit of the AP as a central point for scheduling resource units and benefit of the source peer station as knowing the needs for communication with the destination peer station. In embodiments of the invention, the source station takes responsibility to shared bandwidth, over a resource allocated to it by the AP, with a peer destination station with which the source station has a direct link session established.

Certain aspects of the present disclosure provide method for wireless communication comprising, at a first station (STA):

receiving, from an access point (AP), an allocation of a resource unit (RU) to the first STA for a direct link (DiL) communication;

transmitting, to a peer second STA, a first frame over a first part of the allocated DiL RU; and receiving a second frame transmitted by the second STA over a second part of the DiL RU allocated to the first STA by the AP.

Consequently, management of peer-to-peer communications is distributed between the AP that has global control on the scheduling of resources at the BSS level (e.g. by arbitrating between UL, DL and DiL needs), and one peer STA that manages a P2P resource unit allocated to it, for example by subleasing or time sharing the resource with the corresponding peer STA. This results into an efficient and simple management of the resources, in particular for direct link communications.

Preferred implementation is when the first part and the second part are time-multiplexed and separated by a short interframe space (SIFS).

In this way, the transmission of the second frame, occupying the second part of the allocated RU, starts just after a SIFS from the end of the transmission of the first frame, occupying the first part, prevents from having the medium preempted by a transmission from another STA not having its NAV set, after the end of the transmission of the first frame.

In particular, the transmitting of the first frame is configured such that the end of transmission of the second frame by the second STA aligns in time with the end of the allocated DiL RU.

This allows the AP to resume control over the medium after the end of the allocated DiL RU without interference from other stations. In fact, if the transmission of the second frame ends before time allocated by the AP for the peer-to-peer communication has elapsed, a station that has not set its NAV may preempt the medium and starts transmitting.

In one implementation, the second frame is a response frame to the first frame.

For example, the second frame is an acknowledgement (ACK) frame sent by the second STA for acknowledging reception of the first frame.

According to embodiments, configuring the transmitting of the first frame comprises setting the length of the first frame such that the time remaining for the second part of the DiL RU (i.e. duration from one SIFS after the end of transmission of the first frame until the end of the allocated DiL RU) matches the transmission time of the second frame.

This causes the DiL communication to occupy the whole duration of the allocated DiL RU without a need for a specific signaling by the first STA to the second STA. This may be implemented when the length of the second frame is known or predictable to the first STA, such as a second frame embodying an immediate acknowledgement for acknowledging the first frame.

In one implementation, setting the length of the first frame comprises:

calculating a time TXTIME1 available for the first STA to transmit a physical protocol data unit (PPDU) comprising the first frame based on a time of transmitting the second frame; and deriving the length of the first frame based on the obtained time TXTIME1 and at least one transmission parameter, such as a modulation and coding scheme (MCS), used for transmitting the first frame, wherein TXTIME1 is calculated as TXTIME0-TXTIME2-SIFS, where:

TXTIME0 is the duration of the RU allocated by the AP for the DiL communication, and TXTIME2 is the time required to the second STA to transmit a physical protocol data unit (PPDU) comprising the second frame.

According to embodiments, configuring the transmitting of the first frame comprises including in the first frame a reverse direction (RD) grant addressed to the second STA that allows the second STA to transmit the second frame in reverse direction to the first STA.

In one implementation, the first frame contains a control field indicating a reverse direction grant (RDG) bit set to one to indicate that the receiving second STA is allowed to transmit the second frame in reverse direction to the first STA.

In a variant, the RDG control field is transmitted to the second STA using a quality of service (QoS)-Null frame.

In another variant, the RDG control field is transmitted to the second STA using a data frame.

In one implementation, configuring the transmitting of the first frame further comprises including in the first frame a duration granted to the second STA to transmit the second frame.

In particular, the duration included in the first frame is set to the maximum time available for transmission, from one SIFS after the end of transmission of the first frame until the end of the allocated DiL RU.

Setting the duration, allows to the second STA to occupy the granted second part of the DiL resource unit. In one implementation, it also requires the second STA to send a frame in the reverse direction even if no or not enough data is available for transmitting by the second STA, for example by padding the second frame.

In one implementation, the duration included in the first frame is set to a value equal to TXTIME0-TXTIME1-SIFS, wherein:

TXTIME0 is the duration of the RU allocated by the AP for the DiL communication, and TXTIME1 is the time required to the first STA to transmit a physical protocol data unit (PPDU) comprising the first frame.

According to embodiments, the allocation of the DiL RU and a length of the DiL RU are included in a trigger frame received from the AP.

In one implementation, the allocation of the DiL RU and a length of the DiL RU are included in a trigger resource scheduling (TRS) field of a data or control frame received from the AP.

In particular, the allocation indicates the central frequency of the DiL RU and the frequency bandwidth of the physical protocol data unit (PPDU) to be transmitted over the DiL RU.

In one implementation, time TXTIME0 allocated by the AP to transmit the PPDU over the DiL RU is obtained based on the length or number of data symbols of the DiL RU and at least one transmission parameter, such as a modulation and coding scheme (MCS), specified by the AP.

Certain other aspects of the present disclosure provide method for wireless communication comprising, at a first station (STA):

receiving, from an access point (AP), an allocation of a first resource unit (RU) to the first STA for a direct link (DiL) communication during a transmission opportunity (TXOP) set by the AP;

determining whether the AP schedules allocation of a second RU to the first STA for a DiL communication during the TXOP;

configuring a first frame to be transmitted to a peer second STA over a part or all of the first DiL RU based on the determining; and transmitting, to the second STA, the configured first frame over the first DiL RU.

According to embodiments, if it is determined that the AP does not schedule allocation of the second DiL RU during the TXOP, the first frame is configured to be transmitted over a part of the first DiL RU.

In particular, the method further comprising receiving a second frame transmitted by the second STA over a second part of the first DiL RU allocated to the first STA by the AP.

According to embodiments, if it is determined that the AP schedules allocation of the second DiL RU during the TXOP, the first frame is configured to be transmitted over all of the first DiL RU.

In particular, the method further comprising:

receiving, from the AP, an allocation of the second DiL RU to the first STA during the TXOP;

transmitting, to the second STA, a third frame over a first part of the second DiL RU; and receiving a second frame transmitted by the second STA over a second part of the second DiL RU allocated to the first STA by the AP.

In one implementation, the determining comprises obtaining, from the AP, an information indicating whether the AP schedules allocation of a second RU to the first STA for a DiL communication during the TXOP.

According to embodiments, allocation of the first DiL RU and allocation of the second DiL RU are included in distinct frames received from the AP in a cascading sequence within the TXOP.

In particular, the frame including allocation of the first DiL RU further comprises an information indicating that the AP schedules allocation, in a following frame, of a second DiL RU to the first STA during the TXOP.

According to embodiments, allocation of the first DiL RU and allocation of the second DiL RU are included in a single frame received from the AP.

In one implementation, information indicating that the AP schedules allocation of a second DiL RU to the first STA during the TXOP is obtained from the allocation of the second DiL RU in the received frame.

According to embodiments, a frame comprising allocation of one or more DiL RUs is either a trigger frame or a data or control frame including a trigger resource scheduling (TRS) field.

Certain other aspects of the present disclosure provide a method for wireless communication comprising, at a first station (STA):

receiving, from an access point (AP), an allocation of a first resource unit (RU) to the first STA for a direct link (DiL) communication during a transmission opportunity (TXOP) set by the AP;

receiving, from the AP, an allocation of a second RU to the first STA for a DiL communication during the TXOP;

transmitting, to a peer second STA, a first frame over the first DiL RU;

transmitting, to the second STA, a third frame over a first part of the second DiL RU; and receiving a second frame transmitted by the second STA over a second part of the second DiL RU allocated to the first STA by the AP.

In one implementation, the second frame is a response frame to the first frame.

Additional optional features that concern the different aspects of the disclosure related to a station are explained here below. While they reference a method, they can be transposed into apparatuses or programs according to the invention.

In one implementation, the AP allocates one or more multi-user (MU) resource units using an orthogonal frequency division multiple access (OFDMA) scheme over an operating frequency band of a basic service set (BSS).

In one implementation, the allocated DiL RU has a frequency band that is multiple of 20 MHz channels.

In one implementation, the allocated DiL RU has a frequency band that spans over the whole operating frequency band.

This avoids co-channel interference due to desynchronization.

In one implementation, a peer-to-peer communication in an allocated DiL RU is performed using a single-user (SU) format.

This allows the emitting station to set values for the transmission parameters that are adapted to the peer-to-peer communication. Values chosen by the emitting station may differ, for at least part of the parameters, from the values set or specified by the AP for uplink communications. The source STA may choose for example a different transmission power when transmitting towards a peer destination STA than when transmitting to the AP.

In one implementation, transmitting the first frame comprises:

choosing, by the first STA, values of at least one transmission parameter; and sending the first frame over the DiL RU allocated by the AP to the second STA using the values chosen by the STA.

In one implementation, a transmission parameter is one of: coding type, MCS, DCM and the spatial streams (SS) of the first frame.

In one implementation, the first frame transmitted by the first STA to a peer second STA includes a physical (PHY) preamble and a payload and wherein the payload is transmitted over the DiL RU and the PHY preamble over each 20 MHz channel forming the DiL RU.

In some embodiments, the second STA is not associated with the AP.

Certain other aspects of the present disclosure provide a method for wireless communication comprising, at an access point (AP):

transmitting a frame that includes an allocation of a direct link (DiL) resource unit (RU) to a station (STA) for a DiL communication; and configuring a network allocation vector (NAV) of the AP to align with the end of the DiL RU.

Contrary to conventional downlink and uplink communications involving the AP either as a transmitter or as a recipient, the AP does not transmit or receive during the allocated DiL RU. Consequently, the AP sets its NAV all along the duration of the DiL RU to prevent the AP to access the channel too early, which may cause interference with an ongoing P2P communication. For example, interference may occur if the destination peer STA is too far away from the AP, e.g. in case of a destination STA not associated with the AP. In this case, signals transmitted by the destination STA during a period of the DiL RU may reach the AP with a strength below a detection threshold and thus the AP would have sensed the medium as idle during that period is its NAV is not set.

In one implementation, the configuring is based on a time TXTIME0 required to transmit a physical protocol data unit (PPDU) over the allocated DiL RU.

In one implementation, the frame further includes a length field indicating the length of the allocated DiL RU thereby allowing the STA to determine time TXTIME0.

According to embodiments, the frame including allocation of the DiL RU is either a trigger frame or a data or control frame including a trigger resource scheduling (TRS) field.

Certain other aspects of the present disclosure provide a method for wireless communication comprising, at an access point (AP):

transmitting a first frame that includes an allocation of a first resource unit (RU) to a first station (STA) for a direct link (DiL) communication during a transmission opportunity (TXOP) set by the AP;

transmitting an information to the first STA indicating that the AP schedules, in a following frame, allocation of a second RU to the first STA for a DiL communication during the TXOP; and transmitting a second frame that includes the allocation of the second RU to the first STA for the DiL communication during the TXOP.

According to embodiments, the first and second frames are transmitted by the AP in a cascading sequence within the TXOP.

According to embodiments, the first and second frames are either a trigger frame or a data or control frame including a trigger resource scheduling (TRS) field.

Additional optional features that concern the different aspects of the disclosure related to an AP are explained here below. While they reference a method, they can be transposed into apparatuses or programs according to the invention.

In embodiments, the AP allocates one or more multi-user (MU) resource units using an orthogonal frequency division multiple access (OFDMA) scheme over an operating frequency band of a basic service set (BSS).

In a preferred implementation, the allocated DiL RU has a frequency band that is multiple of 20 MHz channels.

In a further preferred implementation, the allocated DiL RU has a frequency band that spans over the whole operating frequency band. This avoids co-channel interference due to desynchronization.

In particular, a peer-to-peer communication in an allocated DiL RU is performed using a single-user (SU) format. This allows the emitting station to set values for the transmission parameters that are adapted to the peer-to-peer communication. Values chosen by the emitting station may differ, for at least part of the parameters, from the values set or specified by the AP for uplink communications. The source STA may choose for example a different transmission power when transmitting towards a peer destination STA than when transmitting to the AP.

Aspects of the invention also provide a wireless communication apparatus of a first station (STA), comprising:

a receiver configured to receive, from an access point (AP), an allocation of a resource unit (RU) to the first STA for a direct link (DiL) communication; and a transmitter configured to transmit, to a peer second STA, a first frame over a first part of the allocated DiL RU; and wherein the receiver is further configured to receive a second frame transmitted by the second STA over a second part of the DiL RU allocated to the first STA by the AP.

Aspects of the invention also provide a wireless communication apparatus of a first station (STA), comprising:

a receiver configured to receive, from an access point (AP), an allocation of a first resource unit (RU) to the first STA for a direct link (DiL) communication during a transmission opportunity (TXOP) set by the AP;

a processor configured to:

determine whether the AP schedules allocation of a second RU to the first STA for a DiL communication during the TXOP; and to configure a first frame to be transmitted to a peer second STA over a part or all of the first DiL RU based on the determining; and the apparatus further comprising a transmitter coupled to the processor, the transmitter configured to transmit, to the second STA, the configured first frame over the first DiL RU.

Aspects of the invention also provide a wireless communication apparatus of an access point (AP), comprising:

a transmitter configured to transmit a frame that includes an allocation of a direct link (DiL) resource unit (RU) to a station (STA) for a DiL communication; and a processor configured to configure a network allocation vector (NAV) of the AP to align with the end of the DiL RU.

Aspects of the invention also provide a wireless communication apparatus of an access point (AP), comprising a transmitter configured to transmit:

a first frame that includes an allocation of a first resource unit (RU) to a first station (STA) for a direct link (DiL) communication during a transmission opportunity (TXOP) set by the AP;

an information to the first STA indicating that the AP schedules, in a following frame, allocation of a second RU to the first STA for a DiL communication during the TXOP; and a second frame that includes the allocation of the second RU to the first STA for the DiL communication during the TXOP.

Another aspect of the invention relates to a non-transitory computer-readable medium storing a program which, when executed by a microprocessor or computer system in a device, causes the device to perform any method any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3a illustrates the format of a trigger frame as described in the 802.11ax standard to perform MU UL OFDMA transmissions;

FIG. 3*b* illustrates the format of Trigger Dependent User info subfield as described in the 802.11ax standard to perform MU UL OFDMA transmissions;

FIG. 3*c* illustrates the format of TRS subfield as described in the 802.11ax standard to perform MU UL OFDMA transmissions;

FIGS. 9 and 10 illustrate, using a flowchart, operations of the AP and a source STA according to embodiments of the invention. In these embodiments, the AP allocates two DiL RUs to the source STA in a TXOP;

FIG. 11 illustrates, using a flowchart, operations of an AP according to embodiments of the invention.

FIG. 12 illustrates, using a flowchart, operations of a source STA according to embodiments of the invention;

DETAILED DESCRIPTION OF EMBODIMENTS

Figure 1:
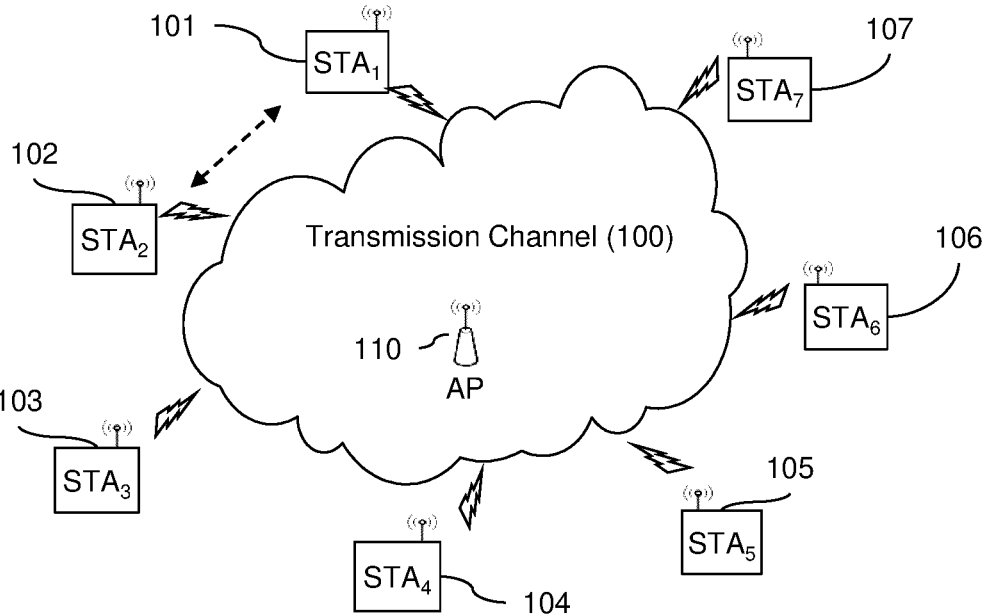
FIG. 1 illustrates a typical wireless communication system in which embodiments of the invention may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a wireless communication system in which several communication stations 101-107, 110 exchange data frames over a radio transmission channel 100 of a wireless local area network (WLAN). A central station, namely access point (AP) 110, may manage a basic service set (BSS) of the wireless system. More than one BSS may be managed by an AP if it implements virtual APs. The radio transmission channel 100 is defined by an operating frequency band (OFB) constituted by a single channel or a plurality of channels forming a composite channel.

Exemplary situation of direct communications, corresponding to an increasing trend nowadays, is the presence of peer-to-peer (P2P) transmissions in between non-AP stations, e.g. STA 102 and STA 101 illustrated in the Figure. Technologies that support P2P transmissions are for example WiFi-Miracast® or Wireless Display scenario, or Tunneled Direct Link Setup (TDLS). Note that even if P2P flows are usually not numerous, the amount of data per flow may be huge (typically low-compressed video, from 1080p60 up to 8K UHD resolutions).

Each STA 101-107 may associate with the AP 110 during an association procedure. During the association procedure, the AP 110 assigns a specific Association IDentifier (AID) to the requesting STA. For example, the AID is a 16-bit value uniquely identifying the STA.

The stations 101-107, 110 may compete one against another using EDCA (Enhanced Distributed Channel Access) contention, to access the wireless medium in order to be granted a transmission opportunity (TXOP) and then transmit (single-user, SU) data frames. The stations may also use a multi-user (MU) scheme in which a single station, usually the AP 110, is allowed to schedule a MU transmission, i.e. allowing multiple simultaneous transmissions to or from other stations, in the wireless network. One implementation of such a MU scheme has been for example adopted in IEEE 802.11ax amendment standard, as the Multi-User Uplink and Downlink OFDMA (MU UL and DL OFDMA) procedures.

Figure 2A:
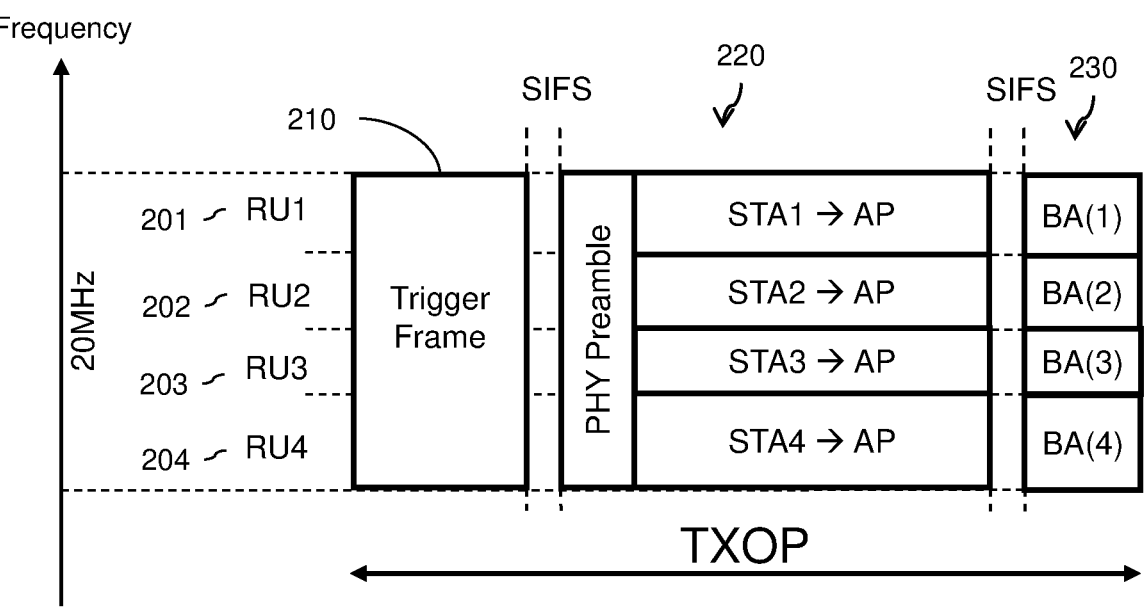
FIGS. 2a and 2b illustrate a conventional trigger-based (TB) MU UL OFDMA transmission with acknowledgment according to 802.11ax.

With reference to FIG. 2*a*, to actually perform such MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

To finely control the MU UL transmissions by the non-AP stations 101-107, the AP 110 sends a trigger frame 210 which defines how the channel is split into RUs and which non-AP station is allowed to transmit over each RU. In this example, trigger frame 210 assigns RU 201 to STA1, RU 202 to STA2, RU 2013 to STA3 and RU 204 to STA4. The assignment is made using the AIDs of the non-AP stations.

Upon reception of trigger frame 210, each non-AP station determines its assigned RU thanks to its own AID and can start transmit MU frames 220 (known as HE TB PPDU) over its assigned RU to the AP after a SIFS period after trigger frame 210.

Due to the triggering mechanism, the terms "trigger-based MU UL transmission" are used.

After the parallel transmission of the four HE TB PPDUs by stations STA2 to STA4, AP 110 sends individual block ack (BA) 230 over each RU or a multi-station (M-STA) block ack (BA) 230 over the whole band.

Figure 2B:
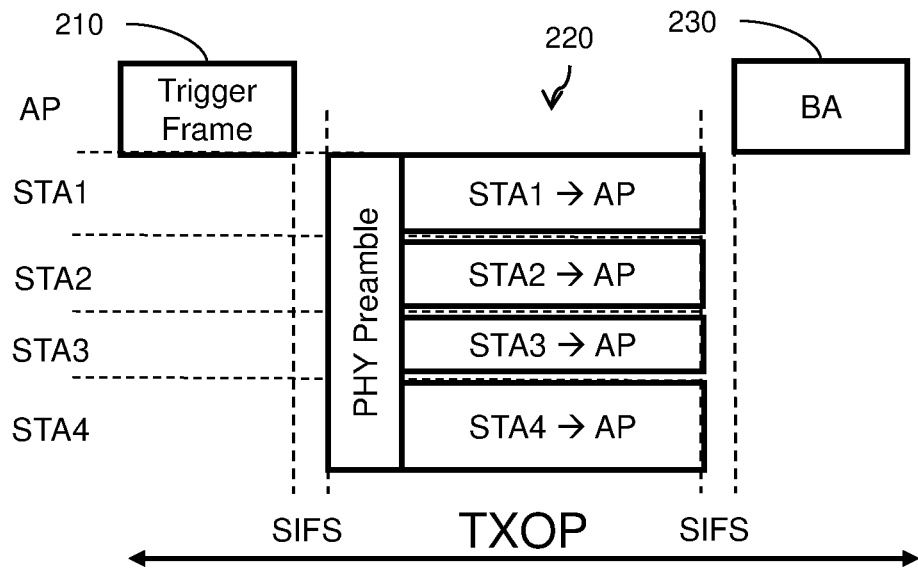

FIG. 2*b* illustrates the same MU UL transmission from station perspective.

Figure 3D:
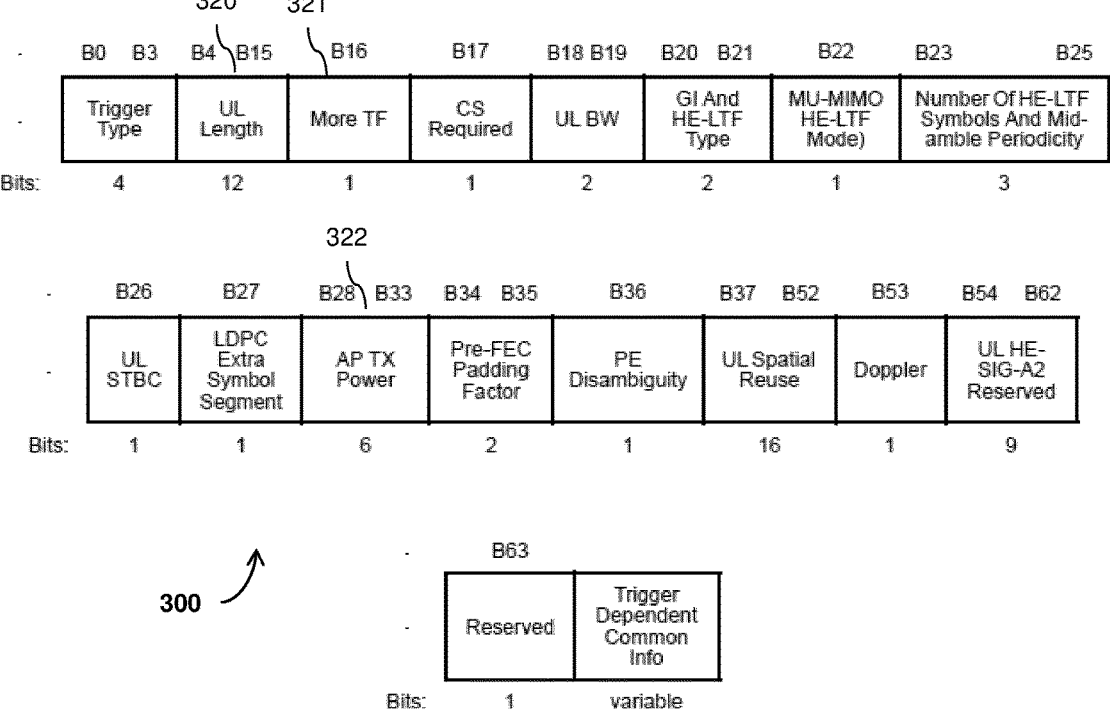
FIG. 3*d* illustrates the format of Common Info field as described in the 802.11ax standard to perform MU UL OFDMA transmissions.

FIG. 3*a* illustrates the format of a trigger frame as described in the 802.11ax standard to perform MU UL OFDMA transmissions.

The trigger frame 210 contains several fields as defined in the IEEE standard 802.11ax and in particular it includes a single Common Info field 300 (FIG. 3*d*) and a plurality of User Info fields 310.

Each User Info field 310 defines the assignment of the RUs defined in the Common Info field 300 to respective non-AP stations 101-107, as well as communication parameters to respect for UL communication with the AP. To do so, RU Allocation subfield 312 identifies the RU concerned (central frequency and frequency bandwidth), while AID12 subfield 311 carries the 12 LSBs of the AID of the non-AP station for which the RU is assigned.

Bit B39 313 of User Info field 310 is currently not used. Trigger Dependent User info subfield 314 is mainly used to provide details on communication parameters defined by the other subfields of the User Info field 310. The content of Trigger Dependent User info subfield 314 (FIG. 3*b*) depends on the type of trigger frame. The format shown in the Figure corresponds to Trigger Dependent User info subfield 314 of a basic trigger frame.

The User Info field as defined in 802.11ax thus clearly authorizes only UL transmissions as only the source non-AP station is identified in AID12 subfield 311.

Figure 2C:
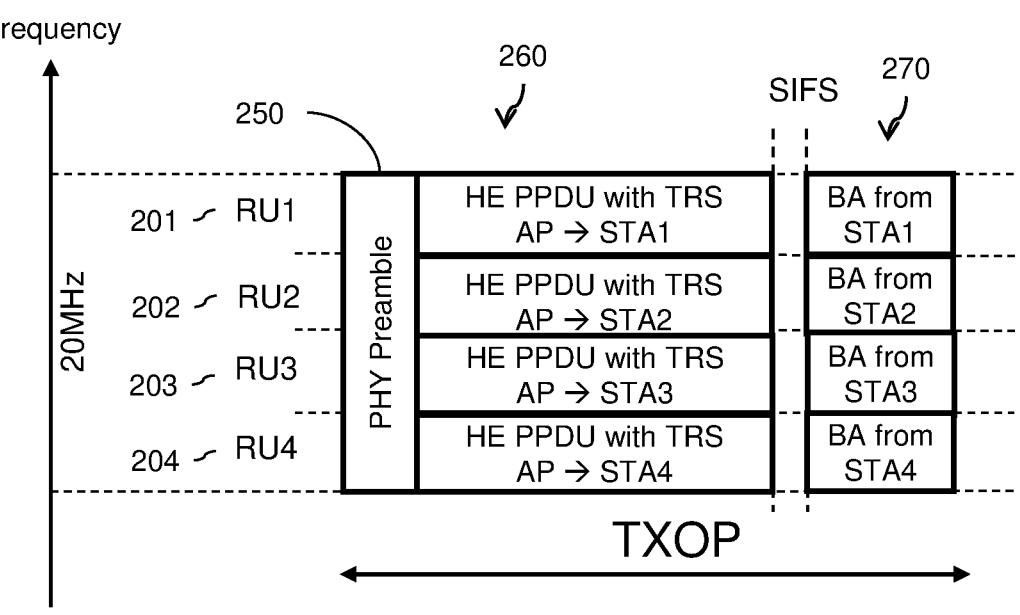
FIGS. 2c and 2d illustrate a conventional MU DL OFDMA transmission with acknowledgment according to 802.11 ax.

FIG. 2*c* illustrates a MU DL transmission in the frequency domain where AP 110 sends data frames (HE PPDUs). As for MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

In the example of the FIGURE, AP 110 defines four RUs to communicate with the four non-AP stations. Preamble 250 contains a description of the RUs and an ordered list of stations that will be the destination non-AP stations for the DL transmissions over each of the RUs 201-204.

Next, AP 110 transmits its data within data frames (HE PPDUs) to the stations: to STA1 over RU1 201, to STA2 over RU2 202, to STA3 over RU3 203 and to STA4 over RU4 204.

In addition to the data themselves, AP 110 can include a TRS control subfield in the A-Control field of each HE PPDU sent to the non-AP stations. This TRS subfield, illustrated in FIG. 3*c*, contains all indication needed by a destination non-AP station (STA1-STA4) to acknowledge the received data in the next MU UL transmission (without having to EDCA access the medium), which is for instance triggered after a SIFS (Short Inter Frame Space) after the MU DL transmission 260.

As shown in FIG. 3*c*, subfield TRS 350 according to 802.11ax includes an UL Data Symbols subfield 351 and the allocation 352 of the RU to use for the destination non-AP station to respond to the data received. The UL Data Symbols subfield indicates the number of OFDM symbols in the Data field of the HE TB PPDU response and is set to the number of OFDM symbols minus 1. The other parameters of TRS subfield 350 are used to indicate the modulation (MCS) 315 and transmission power (based on the expected RSSI at AP side) to be used for the AP to efficiently receive the acknowledgments. Bit B25 (321) is currently not used.

Back to FIG. 2*c*, AP 110 then sends its data frames (PPDUs) 260 to the non-AP stations using the RUs.

The non-AP stations can decode the PPDU 260 received from the AP, including decoding the content of the TRS subfield 350 of the received PPDU.

The non-AP stations then prepare their block ack (BA) packets 270.

After SIFS (Short Inter Frame Space) after the end of the reception of the PPDU, each non-AP station sends its prepared BA packet 270 over the RU specified in field 352 of received TRS subfield 350.

Figure 2D:
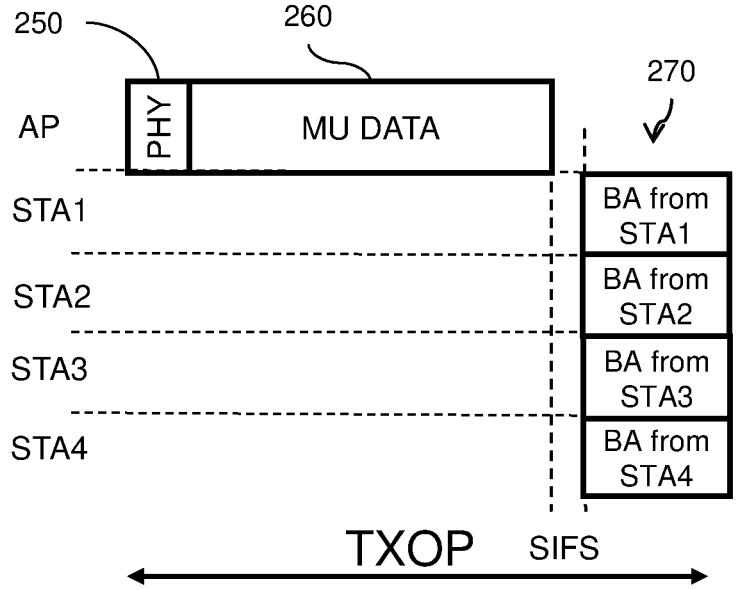

FIG. 2*d* illustrates the same MU DL transmission from station perspective.

Figure 3E:
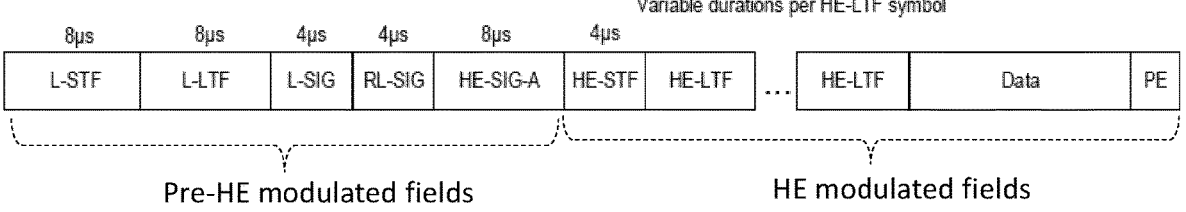
FIG. 3*e* illustrates the format of a HE SU PPDU.

FIG. 3*e* illustrates the format of a HE SU PPDU. It includes in addition to the conventional preamble (L-STF, L-LTF, L-SIG), RL-SIG (Repeated Legacy Signal Field), HE-SIG-A (HE SIGNAL A), HE-STF (HE Short Training Field), HE-LTF (HE Long Training Field), Data and PE (Packet Extension) fields. Legacy preamble and HE-SIG-A are duplicated on each 20 MHz channel. The HE-SIG-A field includes multiple subfields indicating at set of transmission parameters of the PPDU, such as bandwidth (BW), a modulation and coding scheme (MCS), a number of data streams, a coding type, etc.

The illustrated format of HE SU PPDU, as well as other possible formats such as HE MU PPDU and HE TB PPDU (not illustrated) may be used to embody frames according to embodiments of the invention. In addition to these HE PPDUs, other formats can of course be envisaged. For example, Extremely-High-Throughput (EHT) frames introduced in 802.11be may well be used too.

In order to further address the issue of increasing bandwidth and decreasing latency requirements that are demanded for wireless communications systems in high-density environments, aspects of the invention seek to efficiently vary the transmissions allowed in a triggered MU transmission. Aspects of the invention provide features allowing Direct Link (DiL), also referred to as peer-to-peer (P2P), transmissions to be scheduled in a MU transmission and efficiently managed. The management is seen to be distributed between the AP that allocates a resource unit for DiL transmission and a first (source) station that uses the resource for transmitting data and subleasing part of the allocated bandwidth to a second (destination) station that uses the subleased bandwidth to transmit a response frame.

Allocation of a DiL resource unit may be performed by a trigger frame or a data or control frame including a trigger resource scheduling (TRS) subfield.

To that end, the trigger frame sent by the AP to non-AP stations and/or the trigger resource scheduling (TRS) subfield of a data or control frame are enhanced to allocate a resource unit of the MU transmission for data transmission towards a destination non-AP station. They offer Direct Link (DiL) transmission capabilities within the triggered MU transmission, in addition to Down Link (DL) and Uplink (UL) capabilities.

As will be described in more detail herein, a first (source) station that has been allocated a P2P RU by the AP may perform time sharing of the P2P RU with a second (destination) station. Both the source station and the destination station may thus exchange data in peer-to-peer using the resource unit allocated, e.g. by the trigger frame, for P2P transmission to the source station.

The source station uses the P2P capability offered during the triggered MU transmission to send a data frame. Also, the destination station may then receive the data frame over the resource unit allocated and respond with a response frame towards the source station.

Below, DiL RU or P2P RU refers to a resource unit so allocated for Direct Link transmission.

Figure 4A:
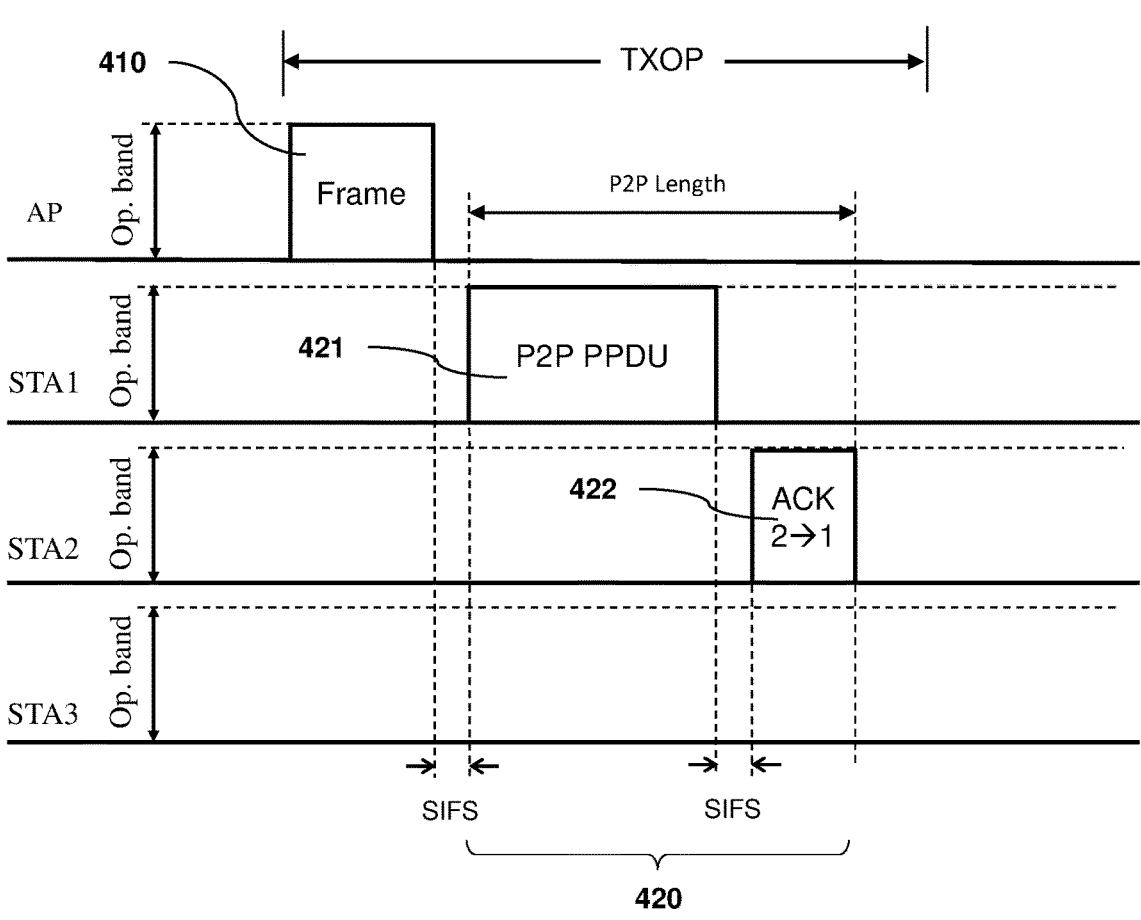
FIG. 4*a* illustrates, from stations perspective, a trigger-based (TB) P2P transmission during a transmission opportunity (TXOP) according to embodiments of the invention.

FIG. 4a illustrates, from stations perspective, a trigger-based (TB) P2P transmission during a transmission opportunity (TXOP) according to embodiments of the invention.

In this example, the P2P transmission 420 triggered by frame 410 that may be a trigger frame (210) or a control or data frame containing a TRS subfield. Also, it is assumed that the P2P transmission occupies all the operating band, which in the illustrated example corresponds to composite channel of 40 MHz.

The frame 410 conveys the signaling of such DiL resource unit. For example, one bit may be used to signal a P2P RU. Then, upon reception of frame 410, the source station is able to determine whether it is allocated a resource unit for DiL, and in the affirmative which resource unit.

The source station uses part of the allocated P2P RU to transmit a physical protocol data unit (P2P PPDU) 421 to the destination station. The destination station uses another part of the P2P RU to transmit a response frame 422, such as an acknowledgment (ACK) frame.

Figure 4B:
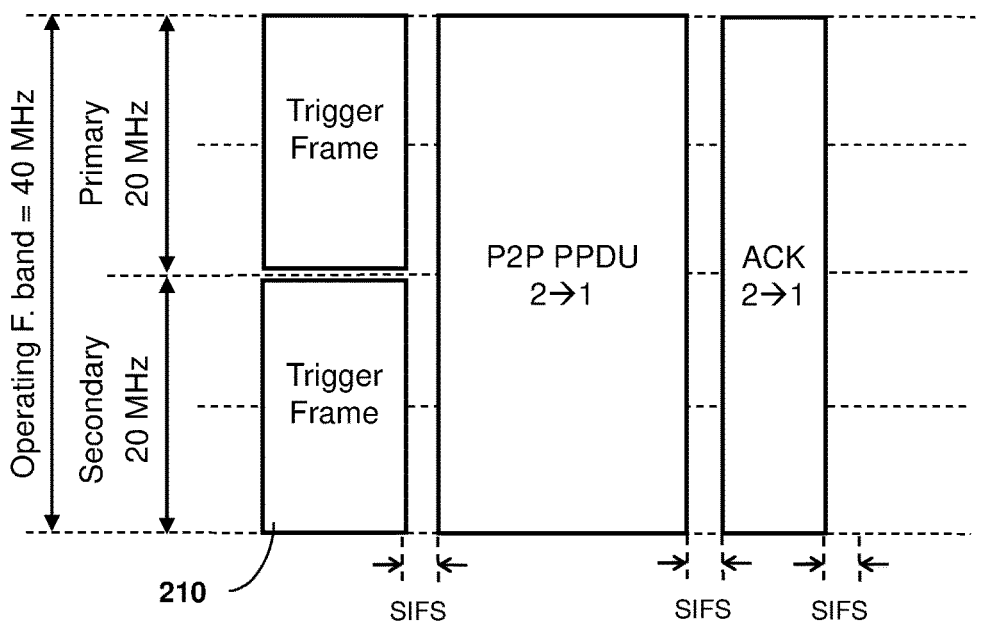
FIG. 4*b* illustrates the TB P2P transmission of FIG. 4*a* from the operating frequency band perspective.

FIG. 4b illustrates the TB P2P transmission of FIG. 4a from the operating frequency band perspective.

Figure 5A:
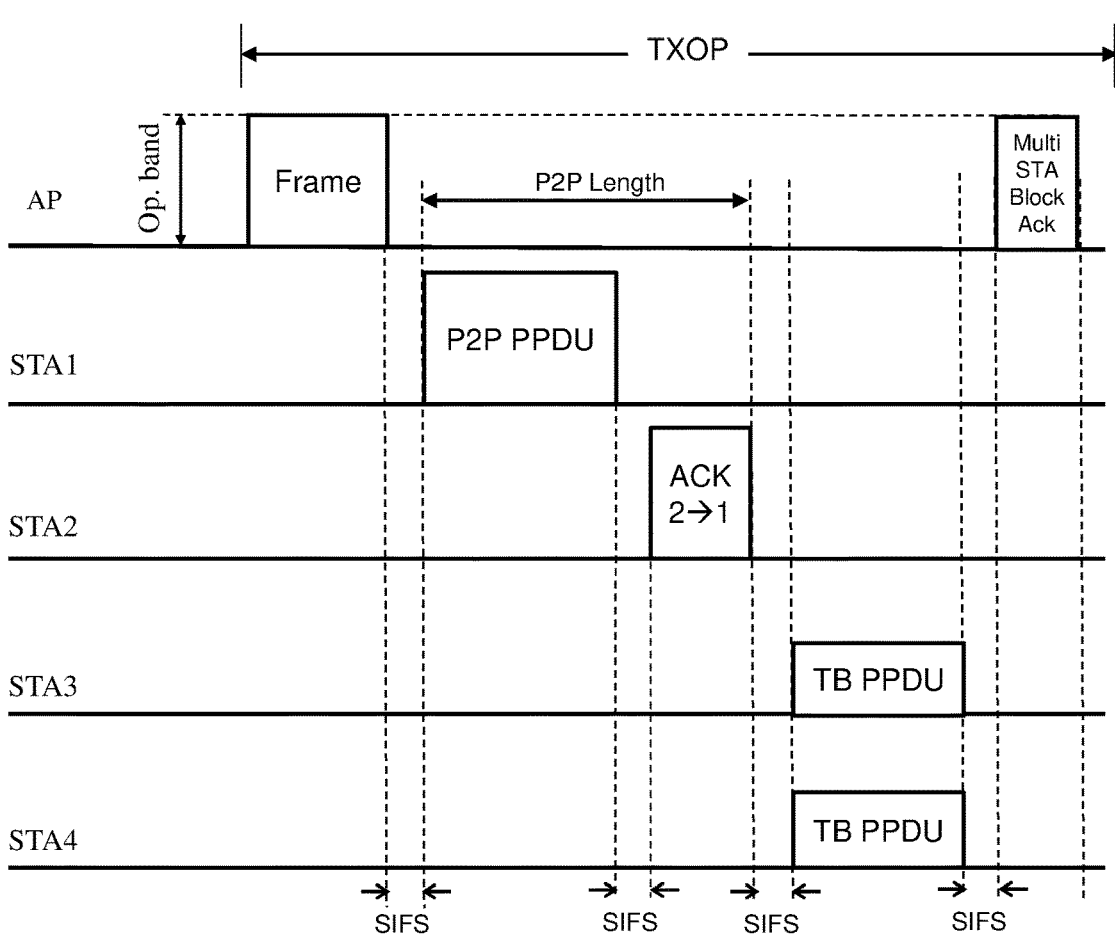
FIG. 5*a* illustrates, from stations perspective, a trigger-based (TB) P2P and UL transmissions during a same transmission opportunity (TXOP) according to embodiments of the invention.

FIG. 5a illustrates, from stations perspective, a trigger-based (TB) P2P and UL transmissions during a same transmission opportunity (TXOP) according to embodiments of the invention.

In these embodiments, the AP allocates more than one UL/DL/DiL phase using one triggering frame (TF or TRS of an HE MU PPDU). In the figure, two phases are illustrated. A P2P phase allowing a P2P communication between STA1 and STA2 (transmission of a P2P PPDU and reception of ACK), and an uplink phase during which STA3 and STA4 transmits each a TB PPDU to the AP. The triggering frame specifies each RU in time and frequency domain. For the time domain, each RU may be defined, from the end of the triggering frame, either by using one global time value or relatively to the ending of a preceding allocated RU. The former makes it possible for the station to go in save mode. The latter allows a better synchronization as it is less sensitive to possible clock shift used by the station to measure the time.

Figure 5B:
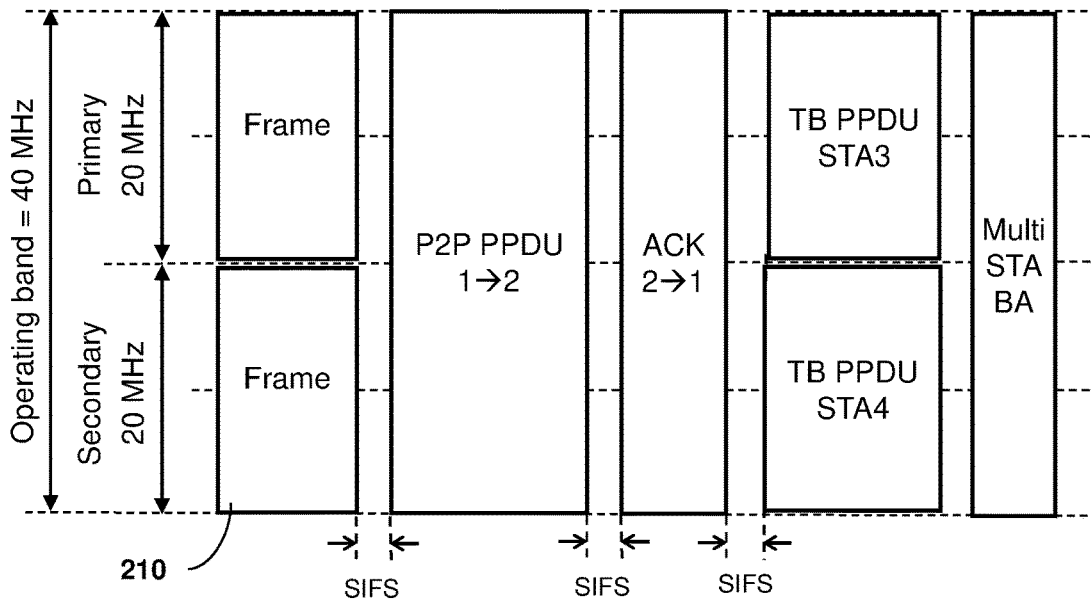
FIG. 5*b* illustrates the TB P2P and UL transmissions of FIG. 5*a* from the operating frequency band perspective.

FIG. 5b illustrates the TB P2P and UL transmissions of FIG. 5a from the operating frequency band perspective.

Figure 6A:
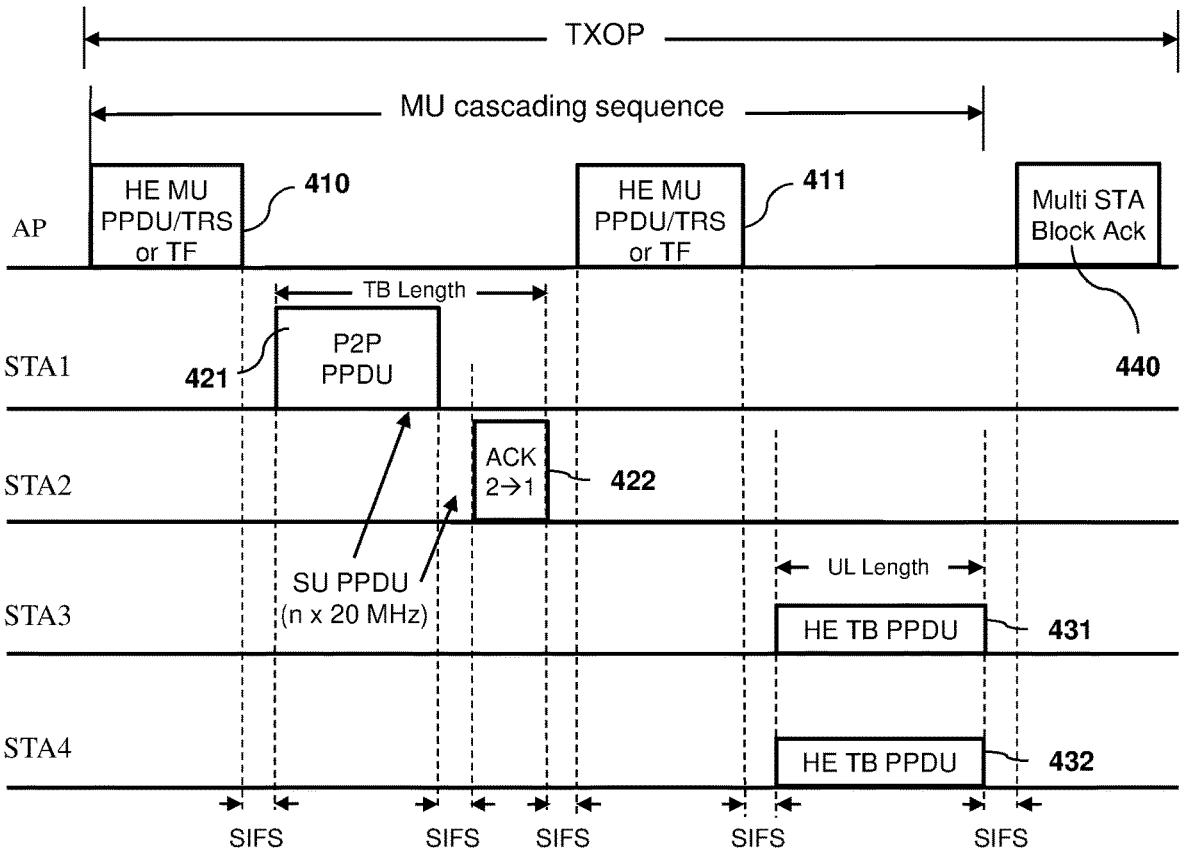
FIGS. 6*a*, 6*b* and 6*c* illustrate a cascading sequence according to exemplary embodiments of the invention.

FIG. 6a illustrates a cascading sequence according to an exemplary embodiment of the invention.

In the illustrated embodiment, two stations (STA1 and STA2) have established a direct link session prior to the MU cascading sequence. Two other stations (STA 3 and STA4) have some data to transmit to the AP.

In the example of this embodiment, the AP initiates a MU cascading sequence to share its gained TXOP between the peers for a direct link transmission, and the two other STAs for MU UL transmission.

To do so, the AP for instance creates a trigger frame indicating STA1 as the recipient of a Resource Unit spanning the whole operating band. This means that no other transmission will occur in parallel of the STA1 transmission. The AP could also send a MU DL PPDU containing a single A-MSDU addressed to the STA1 including a TRS control subfield. This is done (in the example of a trigger frame 210) by only listing one User info field 310 assigned to the STA1 and indicating an RU using all the operating band. The AP also mention on that RU that this is an RU dedicated for direct link transmission.

This latest information can for example be indicated on the RU dedicated for direct link transmission by using 1 bit to encode this information. Several possibilities exist to signal the fact that an RU is dedicated to direct link transmissions. For example, one reserved bit 313 of the user info field can be used to indicate direct link RU (or bit 321 of the TRS subfield 350).

Another possibility, is to set the AID12 field 311 to a specific value indicating an RU for direct link. The AID of the station can then be encoded in a specific format in the trigger dependent info field, or in the user info field itself, since several fields of the user info field 310 are meaningless in the case of the direct link transmission. It is then for example possible to reuse 12 bits (bits B20 to B31) of the user info field to indicate one or more of the followings: the AID of the source peer station, the AID of the destination peer station, or an AID specific to the direct link session between those two peer stations.

The AP then transmit the triggering PPDU (HE MU PPDU 410), and, since the PPDU allocates a RU for Direct Link transmission to STA1, the AP may set its Network Allocation Vector (NAV) that will have the effect of deferring the AP medium access until the end of the direct link transmission (including the Acknowledgment part). The fact that the AP set its NAV after emitting the triggering PPDU allows to avoid possible collision between the Acknowledgement frame 422 transmitted by STA2 and the transmission of the following HE MU PPDU 411 by the AP. The problem here is that the AP may not be able to detect the STA2 transmission. STA2 may be out of reach of the AP's BSS, and too far away from the AP while being close enough to communicate with STA1.

Upon reception of the triggering PPDU 410, STA1 determines that the AP allocated an RU to it for direct link transmission (by reading the information associated with the allocated RU). STA1 then determines time TXTIME0 corresponding to the duration of the RU allocated by the AP for the DiL communication. TXTIME0 determination may be based on parameter values received in the triggering PPDU (e.g. the UL Length field from the trigger frame 210, or the UL Data Symbol parameters 351 and UL HE MCS 315 from the TRS control field 350).

Determination of TXTIME0 may be based on a Length field included in a trigger frame or a Data Symbol subfield included in a TRS subfield. In a similar way to an UL transmission, these fields may be specified by the AP for an allocated P2P RU. By considering that all MU RUs during a same transmission phase has the same length for synchronization purposes, UL Length 320 and UL Data Symbol 351 can be used. As the RUs can be allocated for UL and/or P2P transmissions according to embodiments of the invention, subfields 320, 351 and 315 can be renamed to TB Length, TB Data Symbols and TB HE-MCS respectively. Otherwise, dedicated fields P2P Length, P2P Data Symbols and P2P HE-MCS may be used.

As an example of determination of TXTIME0 based on TB Length, we may use the following relation:

$$TXTIME0 = \frac{UL\_LENGTH}{3} * 4 + 24$$

Or the following to get TB Length based on TXTIME0:

$$TB\_LENGTH = \frac{TXTIME0 - 20}{4} * 3 - 3$$

TXTIME0 may also be determined based on the TB Data Symbol subfield (351) of the TRS (350) that indicates the number of OFDM symbol of the Data portion of the HE TB PPDU, and on the TB HE MCS field (315) (the HE TB PPDU preamble size being known).

Following the allocation of the RU for direct link transmission, STA1 determines a new transmission time TXTIME1 by subtracting to the determined duration TXTIME0, a SIFS duration and a duration TXTIME2 required by the destination peer STA2 to send back a response frame, such as an ACK frame, to source peer STA1. STA1 determines the optimum MCS value to transmit data to STA2 based for example on the SNR measured during a latest past transmission received from STA2. This MCS value and TXTIME2 allow to determine the quantity of data that can be sent from STA1 to STA2. The STA1 then creates the DiL PPDU 421 and transmits it on the RU allocated by the AP. The STA2 after receiving the DiL PPDU 421 on the RU, decodes the PPDU, creates the acknowledgment packet 422, and transmits it, a SIFS duration after the end of the DiL PPDU 421 reception time, on the same RU.

At the expiration of its NAV duration, the AP sense the medium, and is allowed to continue the cascading sequence if the medium is free during a SIFS duration.

The AP may then continue operation using the cascading sequence.

The MU cascading mechanism allows cascading several transmission phases (e.g. UL and DL) during a single TXOP won by an AP. This mechanism provides a low latency transmission for interactive applications, allows a better flexibility to the AP for the scheduling of the stations, and is also used in the scope of the TWT (Target Wake up time) to schedule in time different stations in power saving mode (typically sleeping) that negotiated a power saving contract with the AP. In all those cases, the AP initiates the cascading sequence by sending a triggering MU PPDU 411 that contains at least a trigger frame, or an MSDU with a Triger Response Scheduling (TRS) control subfield.

In the illustrated example, stations STA3 and STA4 are allocated UL RUs for transmitting HE TB PPDUs 431 and 432. Allocated RUs may be signalled in different ways in the HE MU PPDU 411.

Upon reception of the triggering HE MU PPDU 411, if stations STA3 and STA4 are identified as destinations of a MU DL transmission (unique identifier AID of the station listed in the HE SIG-B part of the physical preamble, or AID in the preamble identifying a broadcast Resource Unit), the stations decode the received MSDU, and the included TRS subfield. If the received HE MU PPDU contains a trigger frame, stations STA3 and STA4 are identified as intended receivers of a User Info field 310 in a Trigger frame 411 (i.e., the AID12 subfield 311 equal to the 12 LSBs of the AID of the Station). Each station STA3 and STA4 then decodes the associated User info field.

Based on the TRS control subfield or the trigger frame and User info field, each station determines the Resource Unit (RU) assigned to it, as well as the associated transmission parameters values (fields e.g. MCS, Target RSSI, etc.).

Then, each station generates a packet to be transmitted on the assigned RU. For that, the station first determines the transmission time (TXTIME0) that is granted by the AP. The determination may be performed similarly to what have been discussed above, using either TB or UL Length, Data Symbols or HE MCS fields. Secondly, based on the MCS indicated by the AP and TXTIME0, the station determines the quantity of data that can be transmitted and generates the MSDU packet (containing payload data for example). The MSDU packet is then encapsulated in the HE MU PPDUs 431 and 432 and transmitted, a Short Inter Frame Space (SIFS) duration after the end of the reception of the triggering HE MU PPDU 411.

After the transmission of the triggering PPDU 411, the AP listen the medium, waiting for the reception of HE TB PPDUs 431/432. During the transmission period of the HE TB PPDUs 431/432, the AP decodes the PPDUs (that are all intended to it). A SIFS duration after the end of the transmission, the AP is allowed to take the medium again, and use it to continue the cascading sequence for DL, UL or DiL transmissions until then end of the TXOP. At the end of the TXOP, the AP then sends a Multi STA Block Ack packet 440 to acknowledge all the HE MU PPDUs received by the AP during the cascading sequence.

It is worth noting that the AP may start the cascading sequence by sending the triggering PPDU 411 that doesn't allocate a RU for direct link, and continue the sequence by transmitting the triggering PPDU 410. Any order and/or number of successive transmissions of frames 411 and 411 can be envisaged.

Figure 6B:
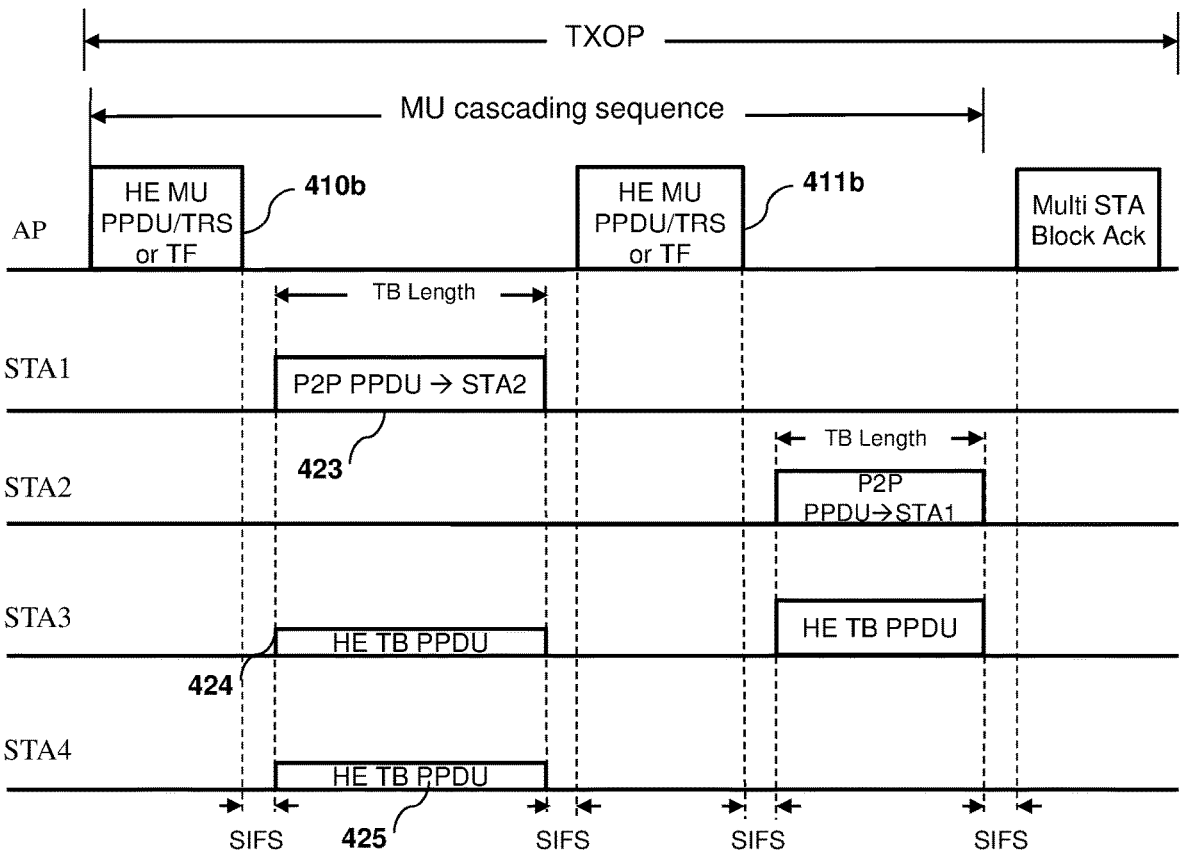

FIG. 6b illustrates a cascading sequence according to another exemplary embodiment of the invention.

In this embodiment, the MU cascading sequence is organized to allow a quick emission of the acknowledgment of the direct link communication while having a multi-user OFDMA transmission in parallel of the direct link transmission. At the origin of the cascading sequence, the AP schedule the emission of the direct link traffic in both directions, but the acknowledgements are emitted in subsequent time slot of the sequence. When the AP sends the triggering PPDU 410b, it indicates at least one RU for direct link transmission. In the example of the FIG. 6*b*, the AP schedule STA1 for direct link transmission, and STA3 and STA4 for an UL transmission in parallel. Normally the AP does not schedule a station for transmission a station that is the receiver of direct link communication scheduled in the same triggering PPDU (except if the station explicitly mentions its capability of doing simultaneous reception and transmission of data on two different RUs).

The signaling to indicate that an RU is dedicated to direct link transmission can be the same as in the embodiment of the FIG. 6*a*, but the RU allocated for direct link transmission are not necessarily occupying the whole operating band. In this example, the only preference is that the DiL RU occupies a bandwidth that is a multiple of 20 MHz. This allows the DiL station to use a SU PPDU with its own preamble different from the MU UL preamble sent in parallel on the remaining 20 MHz channels of the operating band. Upon emission of the triggering PPDU 410*b*, the AP may set its NAV to the duration of the Direct link transmission since in case STA3 and/or STA4 are not able to transmit their HE TB PPDUs for whatever reason, the AP will not take the medium before the end of the direct link transmission.

Upon reception of the triggering PPDU 410*b*, stations STA1, STA3 and STA4 determine that they are intended to use an RU allocated by the AP. In this embodiment, all stations compute their TXTIME0 in the same way as discussed above, which should result into a same value. All transmissions (P2P PPDU 423 and HE TB PPDUs 424 and 425) ending approximately at the same instant.

A main difference in this embodiment compared to embodiment illustrated in FIG. 6*a* is that the DiL emitter STA1 doesn't require immediate acknowledgement to the STA2 (for instance by requesting a delayed block Ack), and will not allocate time for this transmission in the current phase. As a consequence, STA2 will wait for its next transmission opportunity (one of the next phases of the cascading sequence, or a future TXOP) to send back the acknowledgement.

At the end of the transmissions, the AP takes the medium a SIFS duration after the end of the latest transmission, and sends a new triggering PPDU 411*b*, to trigger for example the other peer station (STA2) of the direct link session. This second triggering PPDU 411*b* may also trigger MU UL parallel transmission from another station (for instance STA3) according to embodiments of the invention. Upon reception of this second triggering PPDU 411*b*, STA2 determines TXTIME0 using same mechanism as previously described, and prepare a PPDU containing the acknowledgements of the DiL PPDU 423 received during the previous phase of the cascading sequence. Alternatively, or in addition if there is still room according to the computed TXTIME0, the PPDU may also include data to transmit to the peer STA1. STA3 that also has a RU allocated by the AP prepares a HE TB PPDU similarly to what was performed during the phase of the sequence.

One of the advantages of this embodiment is to allow a more flexible scheduling of a large number of stations during a TXOP because of the possibility of simultaneous transmissions (usage of the MU UL OFDMA scheme). In an embodiment where the AP schedules directly a P2P RU to the responding station (STA2) in second triggering PPDU 411*b*, the AP needs to know the two peer stations involved in the P2P communication. In a variant, the AP schedules in the second triggering PPDU 411*b* a P2P RU to the source STA1. STA1 then sends a frame over this second allocated P2P RU to trigger a response frame from the destination station STA2, and thus by sharing in time the P2P RU. STA1 acts like a triggering station, on behalf of the AP. The AP does have to know then the destination peer station STA2 (STA2 may even be unassociated with the AP).

Because the acknowledgement of a direct link packet sent during one phase of the cascading sequence is sent during one of the subsequent phases of the same sequence, the data sent during the last phase of the sequence cannot be acknowledged before the end of the TXOP.

To solve this issue, a further embodiment of the invention combining the 2 embodiments described in FIGS. 6*a* and 6*b* is envisaged. The first parts of the cascading sequence being operated as in the embodiment of the FIG. 6*b*, and the last phase of the cascading sequence containing direct link transmission being operated as described in the first phase of the FIG. 6*a* (acknowledgements being sent just after the DiL PPDU reception by the receiving peer station).

In this further embodiment, a new signaling may be used to indicate in the definition of the resource unit assigned for direct link to a station, that no subsequent direct link RU will be scheduled in the current cascading sequence to the station. This signaling "NO MORE DiL RU" may for instance use one of the reserved bits currently present in the 802.11ax format of the User Info field 310, in the TRS control subfield, or in the trigger dependent user info field 314. In addition, similarly to the bit indicating the RU for direct link, a dedicated signaling can be put in place in the user info field 310 in the range 20 to 31 of the bits since those bits are unusable in the case of a direct link communication.

Figure 6C:
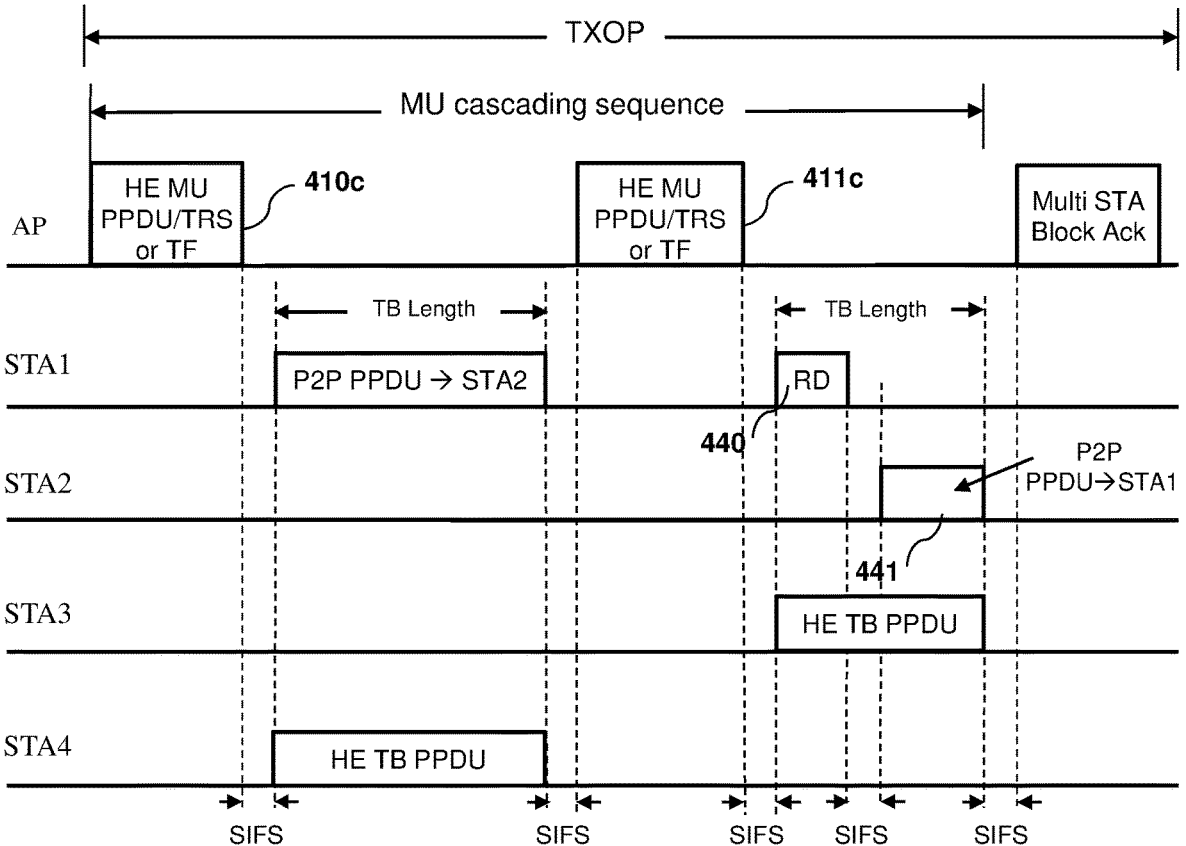

FIG. 6*c* illustrates a cascading sequence according to another exemplary embodiment of the invention.

A main advantage of this embodiment is that one of the two peer stations that have a direct link session established in between may be out of the scope of the BSS. In this embodiment, the AP only schedules for transmission the peer station registered to its BSS, and this peer station can sublease a part of the allocated time to the other peer station, for example by using the Reverse Direction Protocol (RDP). In this embodiment, when the STA1 receives a trigger frame 410*c* allocating it a direct link RU, the station can either use it for its own needs as in previous embodiments of the FIG. 6*a* or 6*b*, or can sublease a part of it to the other peer station of the direct link session.

In the example of FIG. 6*c*, when station STA1 receives a triggering PPDU 410*c* allocating a DiL RU, STA1 determines the allocated transmission time (TXTIME0) as discussed in other embodiments, then prepares and transmits, to the peer station STA2, a P2P PPDU during all the time TXTIME0 (i.e. occupying the all the P2P RU). In a following phase of the same cascading sequence, when STA1 receives a triggering PPDU 411*c*, and after determining the allocated transmission time (TXTIME0), STA1 acts as a Reverse Direction initiator and transmits a PPDU 440 (with a transmission duration TXTIME1 lower than the determined duration TXTIME0). The PPDU 440 contains an HT control field indicating a reverse direction grant (RDG) bit set to one to indicate that the receiving peer can transmit data in reverse direction to the STA1, and a Duration/ID field set preferably to the maximum remaining time (TXTIME0-TXTIME1-SIFS) until the end of the allocated time in the current cascading phase. STA2 can then use the medium a SIFS after the reception of this RDP PPDU 440. STA2 as a RD responder must ensure that its PPDU 441 transmission time will not exceed the remaining duration indicated in the Duration/ID field of the PPDU 440, and then sends a DiL PPDU 441 to STA1 containing either acknowledgment of a previously received PPDU from STA1, or data for the STA1, or a combination of both.

A main difference with conventional usage of the reverse direction protocol is that STA2 has no knowledge that the current reverse direction session is occurring in the scope of a cascading sequence. So STA1 is responsible of handling the special conditions imposed by this scheme. For example, STA1 shall ensure that the current transmission will not end before the end of the allocated time. Because a premature end of transmission by STA2 may allow another station to take the medium and then break the cascading sequence or interfere with a simultaneous HE TB transmission. Consequently, STA2 may need to transmit padding data until the end of the allocated time. If STA2 fails to add the necessary padding, STA1 may add the padding on behalf of STA2. For example, upon reception of the PPDU 441 sent by the STA2, STA1 check if further data will be transmitted by the STA2 (by checking the more data bit of the HT control field included in the QoS data of the PPDU sent by the STA2). If no more data will be transmitted by STA2, and the end of the allocated RU is not yet reached, then STA1 has to send padding data to occupy the medium until the end of the allocated transmission time of the RU.

In a variant, the AP may indicate in the User Info field sent to STA1 for allocating a DiL RU, that an additional DiL RU will be allocated for this direct link session in at least one of the subsequent phases of the current cascading sequence. This can be done by using the "NO MORE DiL RU" signaling as described in FIG. 6*b*.

In another variant, the possibility to use the reverse direction protocol in the DiL RU allocated by the AP is controlled by a signaling (e.g. a bit in the trigger frame User Info field, or in a TRS control field) indicating if the RDP usage is allowed or not. This allows an AP to schedule parallel MU UL transmission by station using a HE TB PPDU without any risk of interference.

For ease of the description, all the examples of cascading embodiments (FIGS. 6*a* to 6*c*) illustrate a cascading sequence comprising two phases. Of course, a cascading sequence according to embodiments of the invention may include only one phase or more than two phases.

Figures 7, 8:
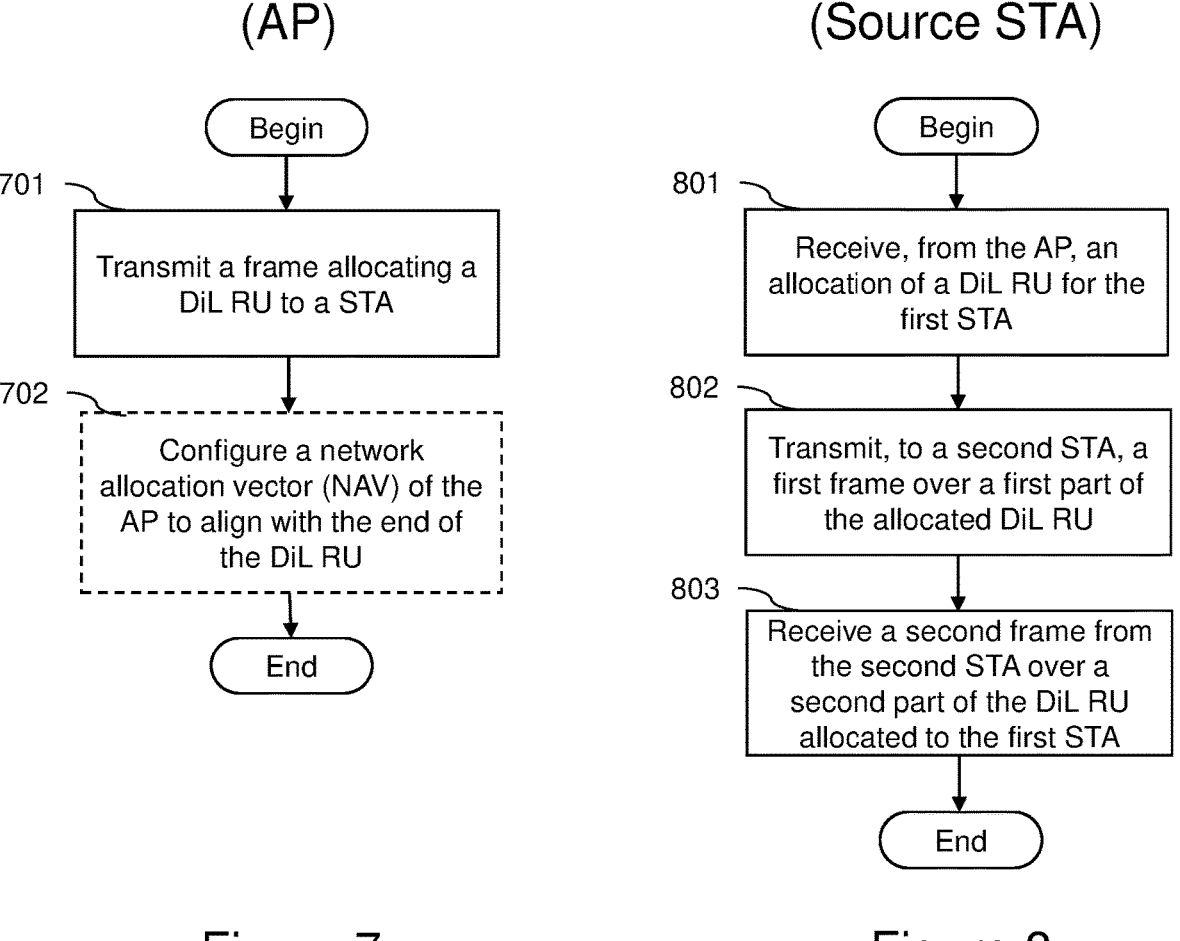
FIG. 7 illustrates using a flowchart an example of a wireless communication method performed by an AP according to embodiments of the invention.
FIG. 8 illustrates using a flowchart an example of a wireless communication method performed by a first station according to embodiments of the invention.

FIG. 7 illustrates using a flowchart an example of a wireless communication method performed by an AP according to embodiments of the invention. These embodiments may be implemented within a cascading sequence, or independently from any cascading sequence.

At step 701, the AP transmits a frame allocating a DiL RU to a first station (e.g. STA1). As discussed in previous embodiments, allocation of the DiL RU may be included in a trigger frame or in a trigger resource scheduling (TRS) field of a data or control frame received from the AP.

In a variant, the AP may signal to the first station and/or second station constraints on the usage of the allocated second DiL RU. For example, the AP may indicate if the usage of the reverse direction protocol over the allocated DiL RU is authorized or not.

At step 702, the AP optionally configures a network allocation vector (NAV) of the AP to align with the end of the DiL RU. The AP sets its NAV all along the duration of the DiL RU to prevent the AP to access the channel too early, which may cause interference with an ongoing P2P communication. Alternatively, the AP may set a timer with the duration of the DiL RU plus one SIFS at the end of transmission of the frame allocating the DiL RU to the first station. Timer expiry corresponds then to the end of the DiL RU, and the AP may then sense the medium again to transmit data.

FIG. 8 illustrates using a flowchart an example of a wireless communication method performed by a first station according to embodiments of the invention. The first station is considered to have an established direct link session with a second station. These embodiments may be implemented within a cascading sequence, or independently from any cascading sequence.

At step 801, the first station receives, from the AP, an allocation of a DiL RU. Optionally, the first station determines if the usage of the reverse direction is allowed in this DiL RU.

At step 802, the first station transmits, to the peer second station, a first frame over a first part of the allocated DiL RU. Only part of the DiL RU is used by the first station to share a remaining part of the allocated DiL RU with the second STA.

At step 803, the first station receives a second frame from the second station over a second part of the DiL RU allocated to the first STA. The second frame may be a response frame or an ACK frame to the first frame transmitted by the first station.

FIGS. 9 and 10 illustrate, using a flowchart, operations of the AP and a source STA according to embodiments of the invention. In these embodiments, the AP allocates two DiL RUs to the source STA in a TXOP. These embodiments may be implemented within a cascading sequence, or independently from any cascading sequence.

At step 901, the AP allocates a first and a second DiL RUs to the first station. As discussed in previous embodiments, allocation of the DiL RU may be included in a trigger frame or in a trigger resource scheduling (TRS) field of a data or control frame received from the AP.

In embodiments, the allocation of the two DiL RUs are signaled in one frame, e.g. trigger frame, to the first STA. In other embodiments, the allocation of the two DiL RUs are signaled in two distinct frames, e.g. trigger frames, to the first STA.

In the case of one triggering frame (TF or TRS of an HE MU PPDU), the frame has to specify each DiL RU in time and frequency domains for the station to which it is assigned can locate it. For the time domain, the DiL RU may be defined, from the end of the triggering frame, either by using one global time value or relatively to the end of a preceding allocated RU. The former makes it possible for the station to go in save mode. The latter allows a better synchronization as it is less sensitive to a possible time shift due to the precision of the clock used by the station to measure time.

At step 902, the AP optionally configures a network allocation vector (NAV) of the AP to align with the end of the second DiL RU. The AP sets its NAV to prevent the AP to access the channel too early, which may cause interference with an ongoing P2P communication.

Note that in the illustrated embodiment of the AP, the NAV is configured to align with the end of the second DiL RU because it is assumed that the first and the second DiL RUs are consecutive, i.e. only separated by a SIFS. If for example, the two DiL RUs are not consecutive and having a DL and/or UL RU in between, the AP may configure two NAVs, each associated with on DiL RU.

Alternatively, the AP may use a timer to measure the total period during which P2P transmissions are ongoing and AP access should be prevented.

More generally, the AP allocates more than one DiL RU to a pair of peer stations having an established direct link session.

Referring to FIG. 10, at step 1001, the first station receives, from the AP, an allocation of a first and a second DiL RUs in a TXOP. At step 1002, the first station uses the whole allocated time for transmitting the first frame towards its peer second station. Then, the first station shares the second DiL RU with the second station. The first station transmits a third frame (step 1003), for example including a RD grant signaling, over a first part of the allocated DiL RU, and then, receives a second frame (response frame) from the second station over a second part of the allocated DiL RU (step 1004).

FIG. 11 illustrates, using a flowchart, operations of an AP according to embodiments of the invention.

The AP transmits a first frame allocating a first DiL RU to a first STA in a TXOP (1101) and a second frame allocating a second DiL RU to the first STA in the TXOP (1104). In order to inform the first STA of the upcoming allocation of the second DiL RU, the AP transmits an information that the AP schedules, in a following second frame, allocation of a second DiL RU to the first STA (1102). The first STA uses this information to efficiently manage sharing of the resources allocated to it with a peer STA, such as for example according to the embodiments of FIG. 12.

According to embodiments, the AP may signal to the first station and/or second station constraints on the usage of the allocated second DiL RU. For example, the AP may indicate if the usage of the reverse direction protocol is authorized or not in the allocated DiL RU.

The AP may optionally configure, after each transmission of a frame allocating DiL RUs, a network allocation vector (NAV) of the AP to align with the end of the respective allocated DiL RU (1103 and 1105).

FIG. 12 illustrates, using a flowchart, operations of a first STA according to embodiments of the invention.

At step 1201, the first STA receives an allocation of a first DiL RU from the AP during a TXOP.

At step 1202, the STA determines whether the AP schedules allocation of a second RU to the first STA for a DiL communication during the TXOP. The determining is performed based on information received from the AP.

According to embodiments, the information is explicitly sent by the AP (e.g. FIG. 11).

According to embodiments, the information is implicit from the allocation performed by the AP. This is for example the case of an embodiment of FIG. 9 in which the allocation of the first DiL RU and the allocation of the second DiL RU to a STA are both signaled in a same frame. Thus, based on this allocation information, the first STA is capable of determining that the AP schedules allocation of the second DiL RU, prior starting sending a frame over the first allocated DiL RU.

If is determined at step 1202 that the AP does not schedule (i.e. does not allocate or do not intend to allocate) a second DiL RU to the first STA, the first STA then executes steps 1203 and 1204, similarly to, respectively, steps 802 and 803 of FIG. 8.

If is determined at step 1202 that the AP does schedule (i.e. does allocate or intend to allocate) a second DiL RU to the first STA, the first STA then, at step 1206, transmits to the second STA, a first frame over the first allocated DiL RU (similarly to step 1002). After receiving allocation of the second DiL RU at step 1207, the first STA executes steps 1208 and 1209, similarly to, respectively, steps 1004 and 1005 of FIG. 10.

Some of the features of the different embodiments described in this disclosure may be listed as follows:

No Change in the direct link setup/teardown procedure;

Triggered P2P feature may be controlled by a capability exchange (both at AP or STA level);

P2P traffic is triggered by the AP for a "Single-User style" PPDU:

AP can share a part of the TXOP to the P2P traffic, based on 802.11ax cascading mechanism, e.g. the AP provides resource to the source P2P station that is associated with it;

P2P traffic may use a "P2P RU"=n×20 MHz covering all the operating band for that period of time;

Simple signaling (typically 1 bit) to signal "P2P RU";

P2P traffic may use its own preamble on its distinct channel:

AP does not need to provide all trigger transmission parameters (e.g. MCS);

No synchronization requirement (even for Ack part);

SU or MU PPDU format can be envisaged for P2P transmission.

The different embodiments described in this disclosure advantageously allow to take combined benefits of MU and SU operations. For example, from MU operations:

Enhance global cell's efficiency; more efficient compared to SU medium-access schemes (former EDCA Direct-Link protocols, RDP protocol, etc.), and AP can still share Uplink/Downlink RUs from other STAs.

And from SU operations:

P2P stations communicate alone in their allocated RU channel (e.g. operating band);

AP does not need to be aware of P2P transmission characteristics (so does not have to provide all trigger parameters, e.g. MCS);

Acknowledgement may be performed without interference issues (no parallel transmission); and Receiving peer station (destination STA) can be outside of the AP's BSS.

Embodiments of the present disclosure showed for example that:

Trigger Frame is a natural tool for scheduling non-AP stations, including P2P STAs;

Reusing cascading mechanism allows a time sharing for P2P with limited modifications; and that Triggered P2P operation is simple:

P2P stations may be triggered over the operating band, and

P2P stations may use their own PPDU format for the shared period of time (including Ack).

Figure 13A:
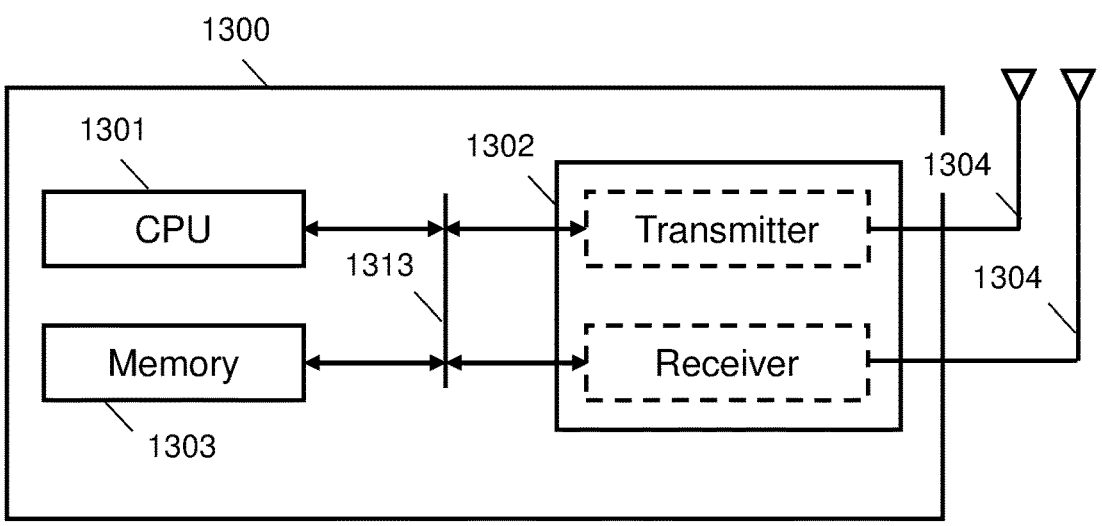
FIG. 13*a* shows a schematic representation a communication device in accordance with embodiments of the present invention.

FIG. 13a schematically illustrates a communication device 1300, either a non-AP station 101-107 or the access point 110, of the radio network 100, configured to implement at least one embodiment of the present invention. The communication device 1300 may preferably be a device such as a micro-computer, a workstation or a light portable device. The communication device 1300 comprises a communication bus 1313 to which there are preferably connected:

a central processing unit 1301, such as a processor, denoted CPU;

a memory 1303 for storing an executable code of methods or steps of the methods according to embodiments of the invention as well as the registers adapted to record variables and parameters necessary for implementing the methods; and at least one communication interface 1302 connected to a wireless communication network, for example a communication network according to one of the IEEE 802.11 family of standards, via transmitting and receiving antennas 1304.

Preferably the communication bus provides communication and interoperability between the various elements included in the communication device 1300 or connected to it. The representation of the bus is not limiting and in particular the central processing unit is operable to communicate instructions to any element of the communication device 1300 directly or by means of another element of the communication device 1300.

The executable code may be stored in a memory that may either be read only, a hard disk or on a removable digital medium such as for example a disk. According to an optional variant, the executable code of the programs can be received by means of the communication network, via the interface 1302, in order to be stored in the memory of the communication device 1300 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

Figure 13B:
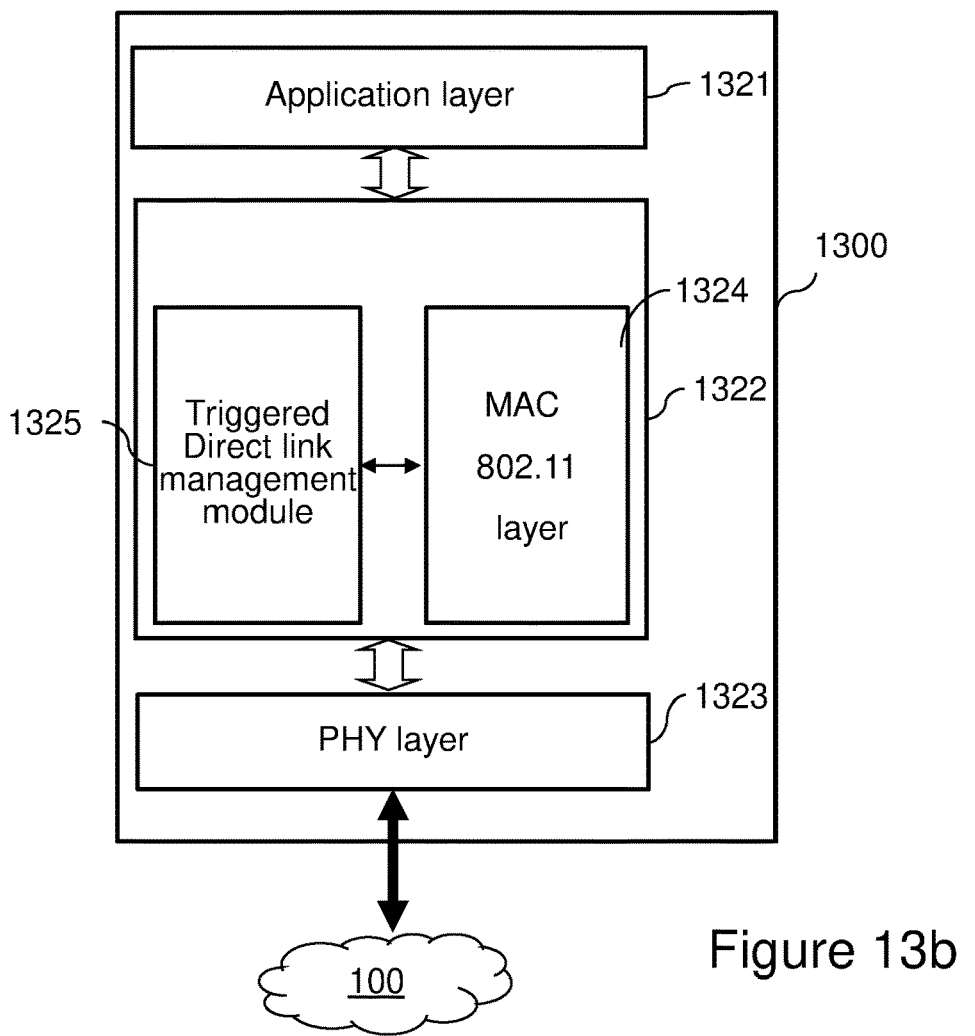
FIG. 13*b* shows a schematic representation of a wireless communication device in accordance with embodiments of the present invention.

FIG. 13b is a block diagram schematically illustrating the architecture of the communication device 1300, either the AP 110 or one of stations 101-107, adapted to carry out, at least partially, the invention. As illustrated, device 1300 comprises a physical (PHY) layer block 1323, a MAC layer block 1322, and an application layer block 1321.

The PHY layer block 1323 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 210 (FIG. 4b) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 1322 preferably comprises an 802.11 MAC layer 1324 implementing conventional 802.11ax MAC operations, and additional block 1325 for carrying out, at least partially, the invention. The MAC layer block 1322 may optionally be implemented in software, which software is loaded into RAM 1312 and executed by CPU 1311.

Preferably, the additional block 1325, referred to as Triggered MU Tx management module for triggered MU transmissions following a medium access trigger frame through OFDMA resource units (sub-channels), implements the part of embodiments of the invention (either from station perspective or from AP perspective).

802.11 MAC layer 1324, Triggered MU Tx management module 1325 interact one with the other in order to process accurately communications over OFDMA RU addressed to multiple stations according to embodiments of the invention.

On top of the Figure, application layer block 1321 runs an application that generates and receives data packets, for example data packets such as a video stream. Application layer block 1321 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for wireless communication comprising, at a first station (STA):

receiving, from an access point (AP), an allocation of a resource unit (RU) to the first STA for a peer to peer (P2P) communication;

transmitting, to a peer second STA, a first frame over a first part of the P2P RU; and receiving a second frame transmitted by the second STA over a second part of the P2P RU allocated to the first STA by the AP, wherein the first part and the second part are time-multiplexed and separated by a short interframe space (SIFS), wherein the transmitting of the first frame is configured such that an end of transmission of the second frame by the second STA aligns in time with an end of the P2P RU, wherein configuring the transmitting of the first frame comprises setting a length of the first frame such that a time remaining for the second part of the P2P RU matches a transmission time of the second frame, and wherein setting the length of the first frame comprises:

calculating a time TXTIME1 available for the first STA to transmit a physical protocol data unit (PPDU) comprising the first frame based on a time of transmitting the second frame; and deriving the length of the first frame based on the obtained time TXTIME1 and at least one transmission parameter, such as a modulation and coding scheme (MCS), used for transmitting the first frame, wherein TXTIME1 is calculated as TXTIME0−TXTIME2−SIFS, where:

TXTIME0 is a duration of the P2P RU allocated by the AP for the P2P communication, and TXTIME2 is a time required for the second STA to transmit a physical protocol data unit (PPDU) comprising the second frame.

2. The method of claim 1, wherein the second frame is a response frame to the first frame.

3. The method of claim 2, wherein the second frame is an acknowledgement (ACK) frame sent by the second STA for acknowledging reception of the first frame.

4. The method of claim 1, wherein configuring the transmitting of the first frame further comprises including in the first frame a reverse direction (RD) grant addressed to the second STA that allows the second STA to transmit the second frame in reverse direction to the first STA.

5. The method of claim 4, wherein configuring the transmitting of the first frame further comprises including in the first frame a duration granted to the second STA to transmit the second frame.

6. The method of claim 5, wherein the duration included in the first frame is set to a value equal to TXTIME0–TXTIME1–SIFS.

7. The method of claim 1, wherein the allocation of the P2P RU and a length of the P2P RU are included in a trigger frame received from the AP.

8. The method of claim 1, wherein the allocation of the P2P RU and a length of the P2P RU are included in a trigger resource scheduling (TRS) field of a data or control frame received from the AP.

9. The method of claim 7, wherein the allocation indicates a central frequency of the P2P RU and a frequency bandwidth of the physical protocol data unit (PPDU) comprising the first frame.

10. The method of claim 9, wherein TXTIME0 is obtained based on a length or number of data symbols of the P2P RU and at least one transmission parameter, such as a modulation and coding scheme (MCS), specified by the AP.

11. The method of claim 1, wherein the second STA is not associated with the AP.

12. A non-transitory computer-readable medium storing a program which, when executed by a microprocessor or computer system in a device, causes the device to perform the method of claim 1.

13. A wireless communication apparatus of a first station (STA), comprising:

a receiver configured to receive, from an access point (AP), an allocation of a resource unit (RU) to the first STA for a peer to peer (P2P) communication; and a transmitter configured to transmit, to a peer second STA, a first frame over a first part of the P2P RU, wherein the receiver is further configured to receive a second frame transmitted by the second STA over a second part of the P2P RU allocated to the first STA by the AP, wherein the first part and the second part are time-multiplexed and separated by a short interframe space (SIFS), wherein the transmitter is further configured to transmit the first frame such that an end of transmission of the second frame by the second STA aligns in time with an end of the P2P RU, wherein the transmitter is further configured to set a length of the first frame such that a time remaining for the second part of the P2P RU matches a transmission time of the second frame, and wherein, to set the length of the first frame, the transmitter is further configured to:

calculate a time TXTIME1 available for the first STA to transmit a physical protocol data unit (PPDU) comprising the first frame based on a time of transmitting the second frame; and derive the length of the first frame based on the obtained time TXTIME1 and at least one transmission parameter, such as a modulation and coding scheme (MCS), used for transmitting the first frame, wherein TXTIME1 is calculated as TXTIME0–TXTIME2–SIFS, where:

TXTIME0 is a duration of the P2P RU allocated by the AP for the P2P communication, and TXTIME2 is a time required for the second STA to transmit a physical protocol data unit (PPDU) comprising the second frame.

\* \* \* \* \*